(12) United States Patent
Tada et al.

(10) Patent No.: US 11,502,347 B2
(45) Date of Patent: Nov. 15, 2022

(54) BATTERY PACK

(71) Applicant: SANYO Electric Co., Ltd., Daito (JP)

(72) Inventors: Manabu Tada, Hyogo (JP); Yuki Takatsuji, Hyogo (JP); Ryusuke Tsujiguchi, Hyogo (JP); Michinobu Ono, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 201 days.

(21) Appl. No.: 16/965,697

(22) PCT Filed: Dec. 11, 2018

(86) PCT No.: PCT/JP2018/045412
§ 371 (c)(1),
(2) Date: Jul. 29, 2020

(87) PCT Pub. No.: WO2019/150774
PCT Pub. Date: Aug. 8, 2019

(65) Prior Publication Data
US 2020/0358063 A1   Nov. 12, 2020

(30) Foreign Application Priority Data

Jan. 31, 2018 (JP) .............................. JP2018-015674

(51) Int. Cl.
H01M 10/653 (2014.01)
H01M 50/213 (2021.01)
(Continued)

(52) U.S. Cl.
CPC ....... *H01M 10/653* (2015.04); *H01M 10/613* (2015.04); *H01M 10/623* (2015.04);
(Continued)

(58) Field of Classification Search
None
See application file for complete search history.

(56) References Cited

U.S. PATENT DOCUMENTS 5,818,198 A    10/1998 Mito et al.
2007/0065718 A1  3/2007 Moon
(Continued)

FOREIGN PATENT DOCUMENTS

JP    H06-080260 U   11/1994
JP    2003-331803 A  11/2003
(Continued)

OTHER PUBLICATIONS

The Extended (supplementary) European Search Report dated Mar. 2, 2021, issued in counterpart EP Application No. 18903451.5. (53 pages).
(Continued)

*Primary Examiner* — Gregg Cantelmo
(74) *Attorney, Agent, or Firm* — WHDA, LLP

(57) ABSTRACT

The secondary battery cells are disposed in parallel in such postures that side surfaces of cylindrical shapes face each other in an internal space of a housing case, and are separated from each other with a longitudinal partition plate interposed between the secondary battery cells. A pair of ribs are provided on an inner surface of the housing case to hold the longitudinal partition plate. The longitudinal partition plate disposed between the pair of ribs is held in the housing
(Continued)

case. A gap between the pair of ribs and the longitudinal partition plate is filled with a flame-retardant adhesive material.

7 Claims, 30 Drawing Sheets

(51) Int. Cl.
*H01M 10/613* (2014.01)
*H01M 10/623* (2014.01)
*H01M 10/643* (2014.01)
*H01M 10/6554* (2014.01)
*H01M 10/658* (2014.01)
*H01M 50/289* (2021.01)
*H01M 50/247* (2021.01)

(52) U.S. Cl.
CPC ....... *H01M 10/643* (2015.04); *H01M 10/658* (2015.04); *H01M 10/6554* (2015.04); *H01M 50/213* (2021.01); *H01M 50/247* (2021.01); *H01M 50/289* (2021.01); *H01M 2220/30* (2013.01)

(56) References Cited

U.S. PATENT DOCUMENTS

| | | | |
|---|---|---|---|
| 2011/0195291 A1* | 8/2011 | Yokoyama | H01M 50/213 429/99 |
| 2011/0293986 A1* | 12/2011 | Kozu | H01M 10/6563 429/120 |
| 2012/0028107 A1* | 2/2012 | Sugita | H01M 50/20 429/156 |
| 2014/0370363 A1 | 12/2014 | Oshiba et al. | |

FOREIGN PATENT DOCUMENTS

| JP | 2007-027011 A | 2/2007 |
|---|---|---|
| JP | 2007-234328 A | 9/2007 |
| JP | 2008-529237 A | 7/2008 |
| JP | 2012-033464 A | 2/2012 |
| JP | 2014-086342 A | 5/2014 |
| JP | 2015-002082 A | 1/2015 |
| JP | 2016-072301 A | 5/2016 |
| JP | 2017-068986 A | 4/2017 |

OTHER PUBLICATIONS

Translation of International Search Report dated Jan. 22, 2019, issued in counterpart Application No. PCT/JP2018/045412. (2 Pages).

* cited by examiner

BATTERY PACK

TECHNICAL FIELD

The present invention relates to a battery pack.

BACKGROUND ART

A battery pack which houses a plurality of cylindrical secondary battery cells in a housing case is used as a power source for an electronic device such as a laptop computer and a portable electronic terminal. This battery pack connects the plurality of cylindrical secondary battery cells in series or in parallel to increase a capacity of the battery pack. Particularly in recent years, it has been demanded to increase the capacity of the battery pack, and also to reduce a size and a weight of the battery pack in terms of portability or the like of the battery pack. Accordingly, it has been promoted to increase each capacity of the secondary battery cells. Moreover, it has been adopted to arrange the secondary battery cells without gaps between the respective secondary battery cells inside the battery pack.

Meanwhile, the secondary battery cells may cause thermal runaway for various reasons such as internal short circuit and overcharge. When any one of a plurality of the arranged secondary battery cells causes thermal runaway and generates flame, the adjacent secondary battery cell is heated and further induces thermal runaway. This thermal runaway propagates and may cause thermal runaway of a large number of the secondary battery cells. It is therefore demanded to eliminate an effect of thermal runaway on the other secondary battery cells even if any one of the secondary battery cells causes thermal runaway.

However, in the configuration where the secondary battery cells are arranged close to each other inside the battery pack, heat is easily transferred between the adjacent secondary battery cells. For avoiding this situation, it is considered to partition the adjacent secondary battery cells using a physical wall for thermal insulation. However, it is not easy to completely eliminate a gap between a wall and the housing case. If there is any gap including a small gap, flame may leak from this gap and inevitably heat the adjacent secondary battery cell.

CITATION LIST

Patent Literature

PTL 1: Unexamined Japanese Patent Publication No. 6-80260
PTL 2: Unexamined Japanese Patent Publication No. 2014-86342

SUMMARY OF THE INVENTION

The present invention has been developed in view of these circumstances. One of objects of the present invention is to provide a battery pack capable of avoiding a chain of thermal runaway while using a plurality of secondary battery cells.

A battery pack according to an aspect of the present invention includes: a plurality of secondary battery cells each having a cylindrical shape and connected in series and/or in parallel with each other; a housing case that has an internal space for housing the plurality of secondary battery cells; and a longitudinal partition plate that is disposed in parallel with a longitudinal direction of the housing case, and constitutes battery housing spaces in the internal space of the housing case, the battery housing spaces each housing a corresponding one of the plurality of secondary battery cells. The plurality of secondary battery cells may be aligned in parallel in such postures that side surfaces of the cylindrical shapes face each other inside the housing case, and may be separated from each other with the longitudinal partition plate interposed between the plurality of secondary battery cells. A pair of ribs may be provided on an inner surface of the housing case to hold the longitudinal partition plate. The longitudinal partition plate disposed between the pair of ribs may be held in the housing case. A gap produced when the longitudinal partition plate is disposed between the pair of ribs may be filled with a flame-retardant adhesive material. According to this configuration, the longitudinal partition plate is disposed between the side surfaces of the secondary battery cells adjacent to each other and facing each other to separate the secondary battery cells. In addition, the gap between the longitudinal partition plate and the housing case is filled with the flame-retardant adhesive material to eliminate the gap. This configuration can effectively prevent a situation where flame leaks from the gap and heats the different adjacent secondary battery cell even if one of the secondary battery cells causes thermal runaway and generates flame.

Moreover, in addition to the above configuration, a battery pack of another aspect of the present invention may further include an insulating thermal resistant plate that has electrical insulation and thermal resistance properties, and covers at least a region of the side surface included in each of the plurality of secondary battery cells and facing the side surface of an adjacent one of the plurality of secondary battery cells. According to this configuration, each of the adjacent and opposed side surfaces of the secondary battery cells is covered with the insulating thermal resistant plate having electrical insulation and thermal resistance properties. Accordingly, even if flame blows out from the side surface of the secondary battery cell during thermal runaway, the adjacent secondary battery cell is not directly exposed to this flam. Instantaneous fire spread is therefore avoidable.

Furthermore, according to a battery pack of a further aspect of the present invention, in addition to any of the above configurations, the insulating thermal resistant plate may be curved along the side surface of the cylindrical shape of the each of the plurality of secondary battery cells. According to this configuration, the insulating thermal resistant plate is capable of covering the corresponding secondary battery cell along the side surface in a posture easily coming into close contact with the side surface, thereby efficiently improving a thermal insulation property in a limited space.

Furthermore, according to a battery pack of a still further aspect of the present invention, in addition to any of the above configurations, the insulating thermal resistant plate may cover each of a pair of the secondary battery cells provided in such a manner that the side surfaces of the cylindrical shapes are located adjacent to each other, and may be curved around a position where the pair of secondary battery cells come closest to each other in a cross-sectional view. According to this configuration, a flame exhaust direction can be regulated such that flame does not flow toward the side surface of the different adjacent secondary battery cell when flame is exhausted from the side surface as a result of thermal runaway of one of the secondary battery cells. Accordingly, safety improves.

In addition, according to a battery pack of a still further aspect of the present invention, in addition to any of the above configurations, the insulating thermal resistant plate may be made of a material containing fibers.

Moreover, according to a battery pack of a still further aspect of the present invention, in addition to any of the above configurations, the insulating thermal resistant plate may be a plate member made of an inorganic material.

Furthermore, according to a battery pack of a still further aspect of the present invention, in addition to any of the above configurations, the insulating thermal resistant plate may be made of mica. According to this configuration, cost reduction and high thermal resistance are achievable.

According to the battery pack of the present invention, the longitudinal partition plate is disposed between the side surfaces of the secondary battery cells adjacent to each other and facing each other to separate the secondary battery cells. In addition, the gap between the longitudinal partition plate and the housing case is filled with the flame-retardant adhesive material to eliminate the gap. This configuration can effectively prevent a situation where flame leaks from the gap and heats the different secondary battery cell even if one of the secondary battery cells causes thermal runaway and generates flame.

DESCRIPTION OF EMBODIMENTS

Figure 1:
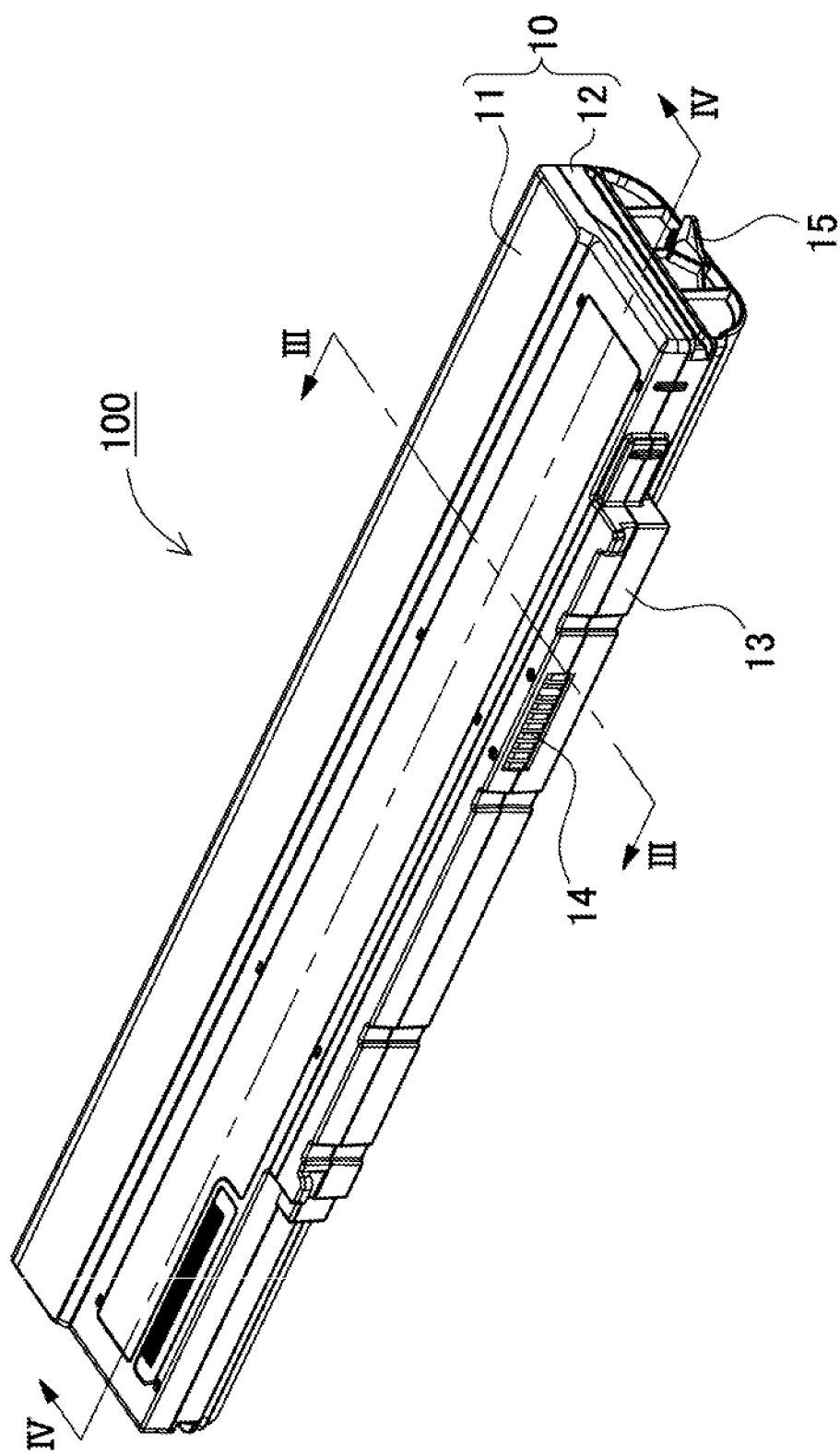
FIG. 1 is a perspective view showing a battery pack according to a first exemplary embodiment.

Exemplary embodiments of the present invention will be hereinafter described with reference to the drawings. Note that the exemplary embodiments described hereinafter are presented as examples embodying a technical idea of the present invention. Accordingly, the present invention is not limited to the followings. In addition, the present description is not definitely presented to limit parts described in the claims to corresponding parts described in the exemplary embodiments. Unless otherwise specified, dimensions, materials, shapes, relative positions, and the like of constituent parts described in the exemplary embodiments are only presented as explanatory examples, and are not intended to limit the scope of the present invention. Note that sizes, positional relationships, and the like of parts shown in the respective drawings may be exaggerated for clarifying the explanation. Furthermore, identical names and reference numerals indicate identical or similar parts in the following description, and detailed description will be omitted where appropriate. In addition, concerning respective elements constituting the present invention, a plurality of elements may be constituted by an identical part such that one part functions as a plurality of elements, or conversely, a function of one part may be shared and implemented by a plurality of parts.

First Exemplary Embodiment

Figure 2:
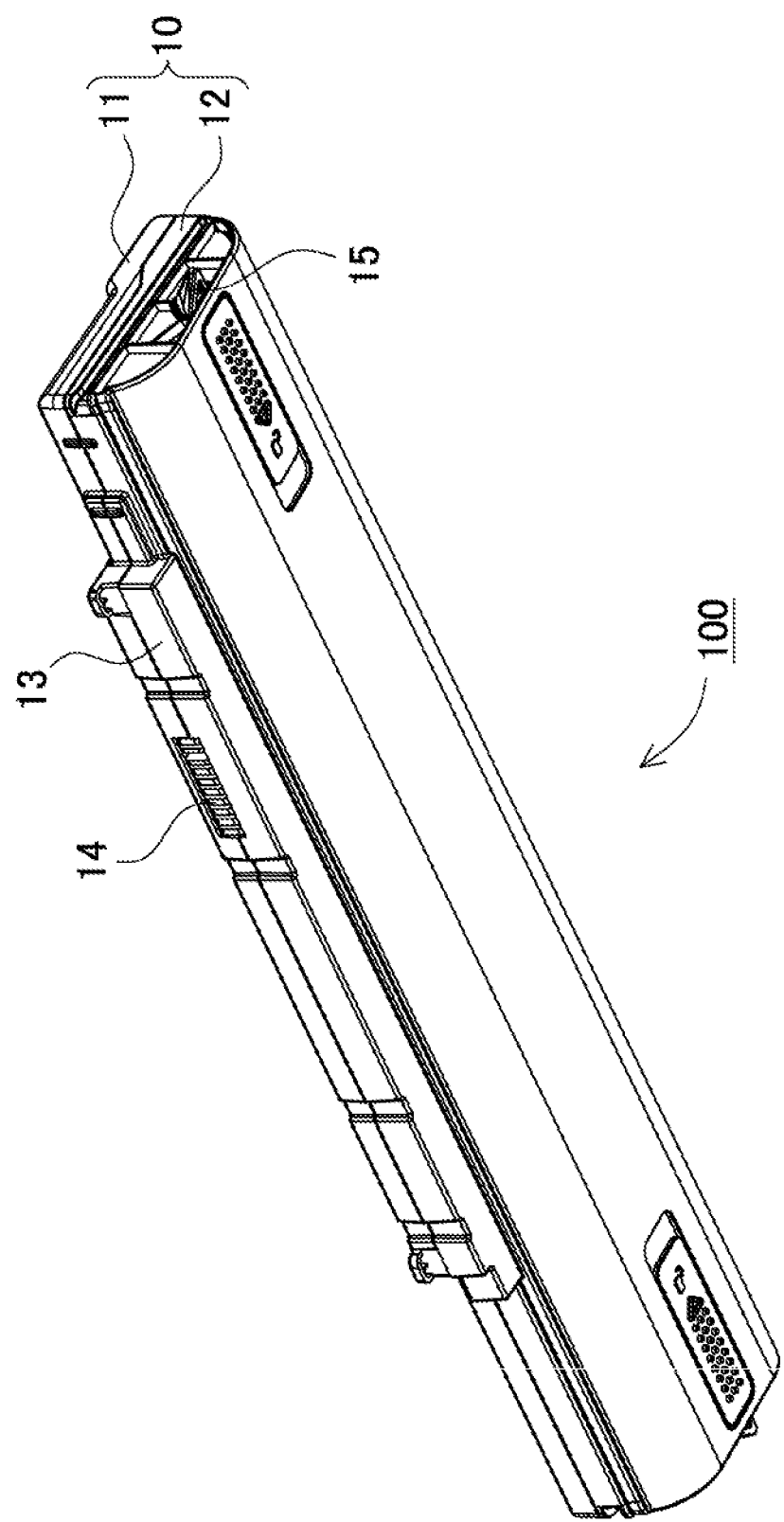
FIG. 2 is a perspective view of the battery pack of FIG. 1 as viewed obliquely from below.
Figure 3:
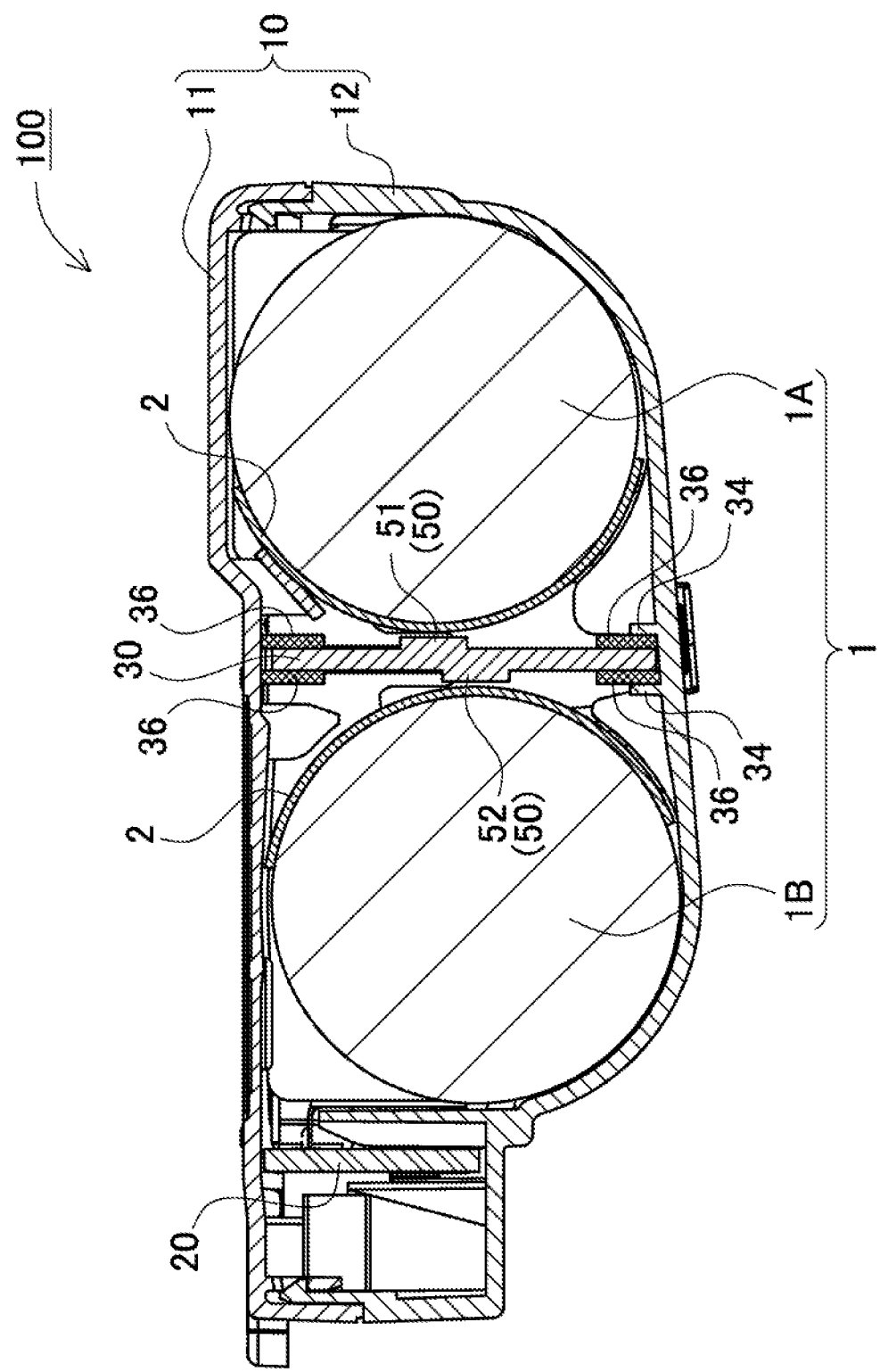
FIG. 3 is a cross-sectional view of the battery pack of FIG. 1 taken along line III-III.
Figure 4:
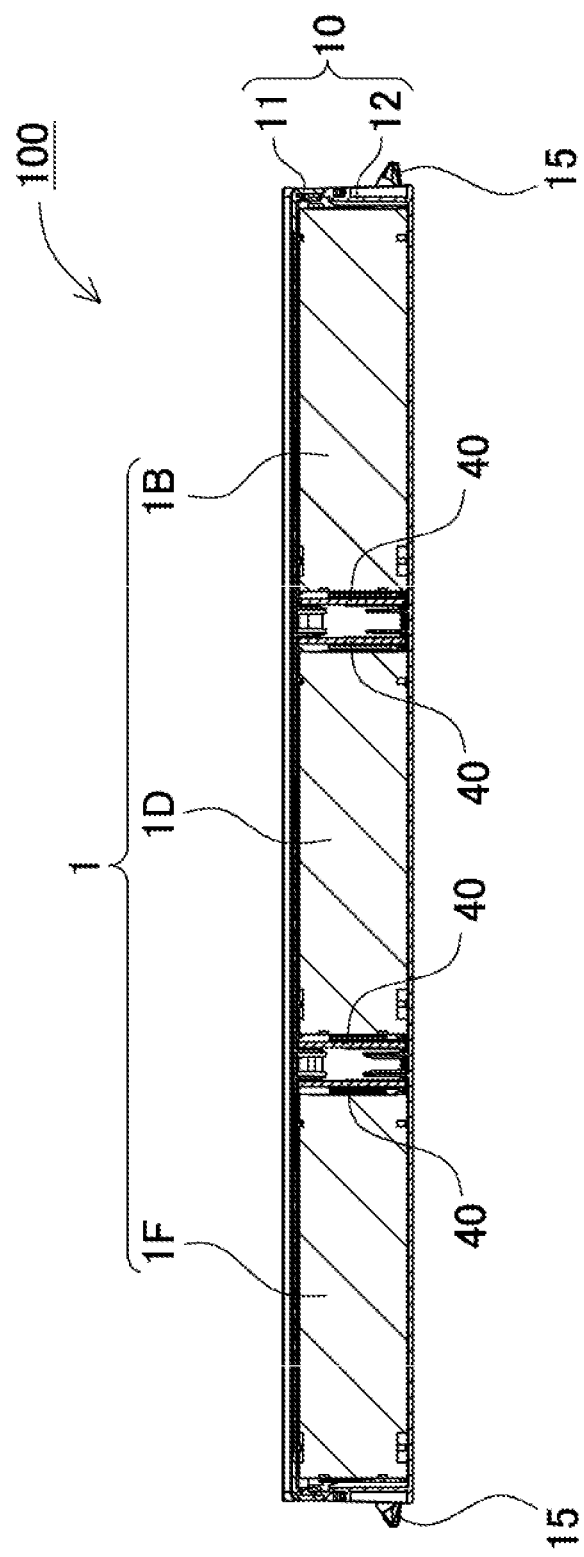
FIG. 4 is a cross-sectional view of the battery pack of FIG. 1 taken along line IV-IV.
Figure 5:
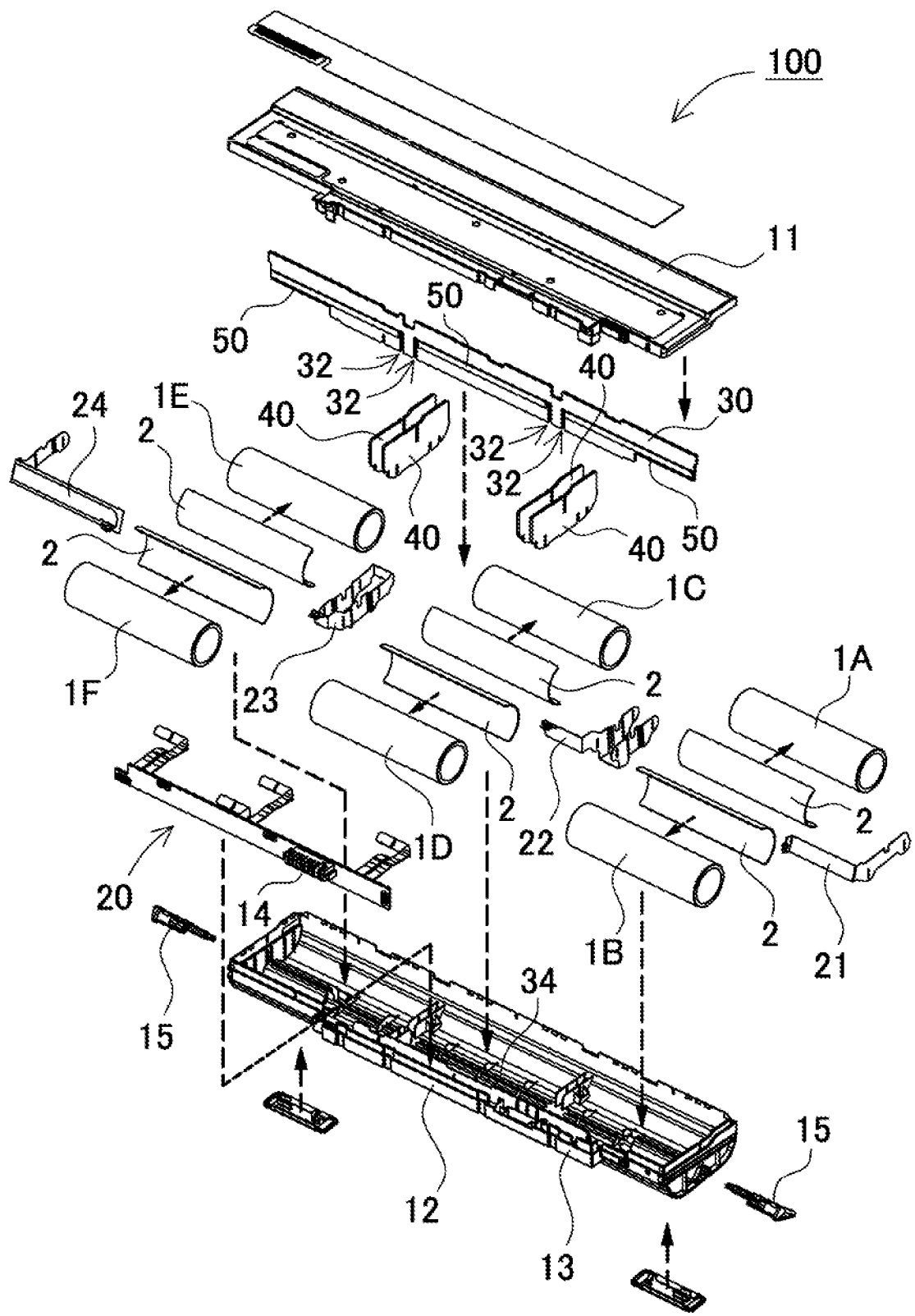
FIG. 5 is an exploded perspective view of the battery pack of FIG. 1.
Figure 6:
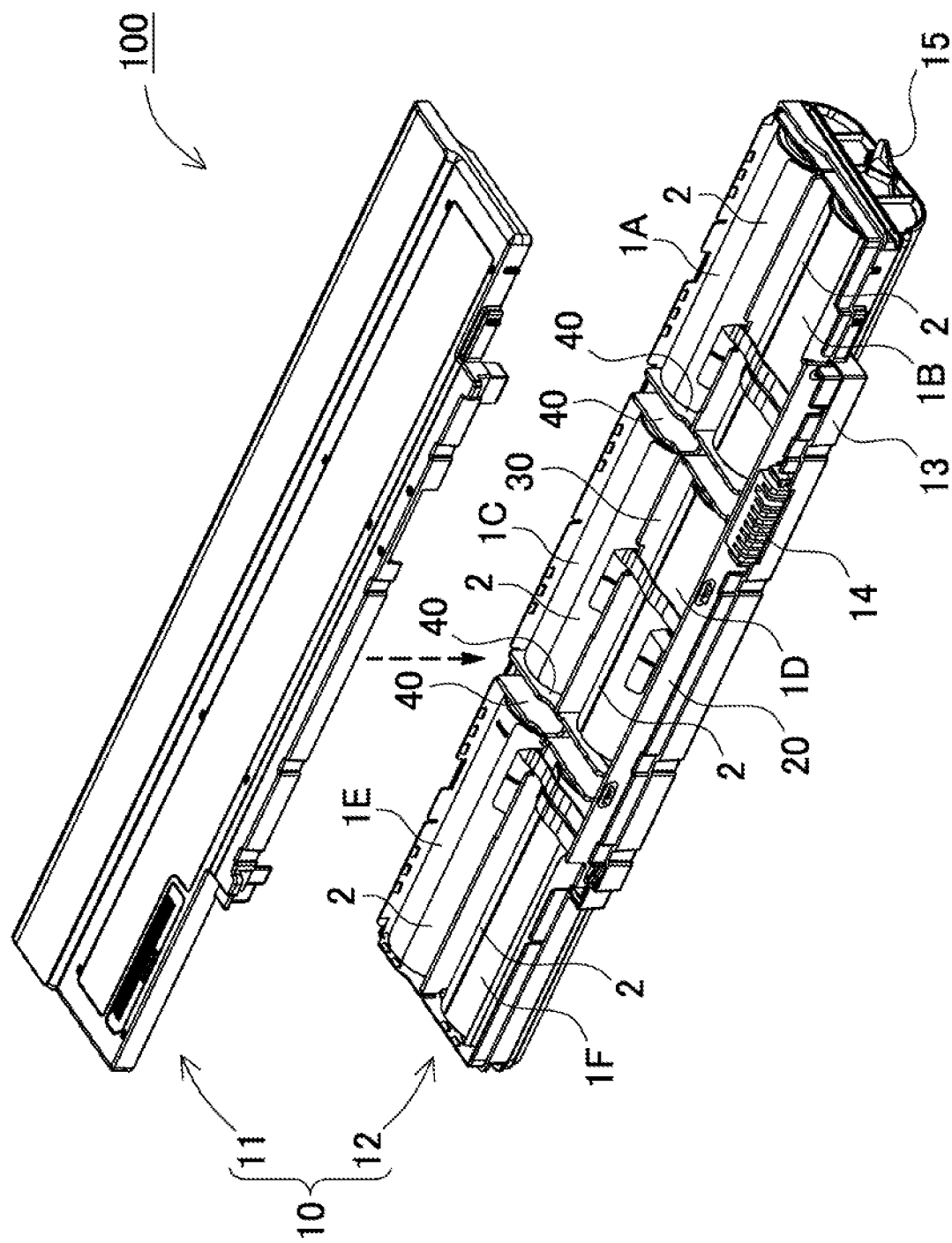
FIG. 6 is a perspective view showing a state of the battery pack of FIG. 1 from which a cover is removed.
Figure 7:
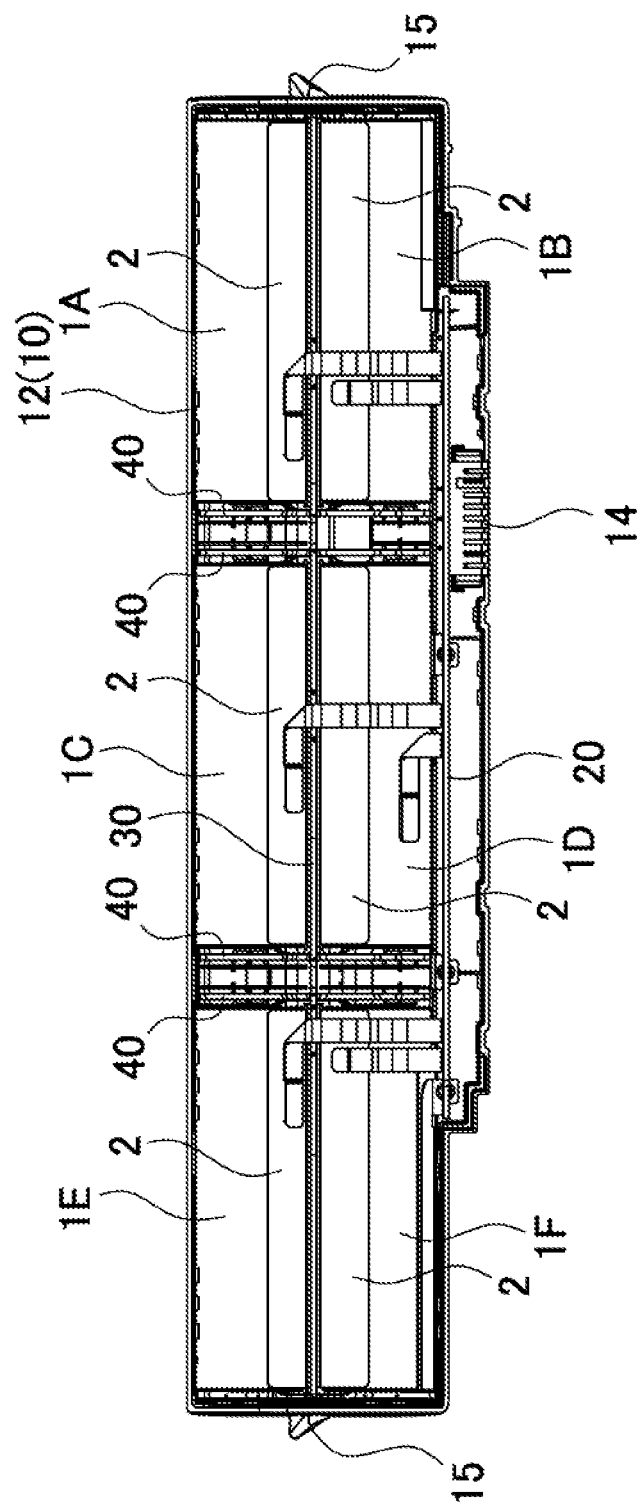
FIG. 7 is a plan view of the battery pack of FIG. 6.
Figure 8:
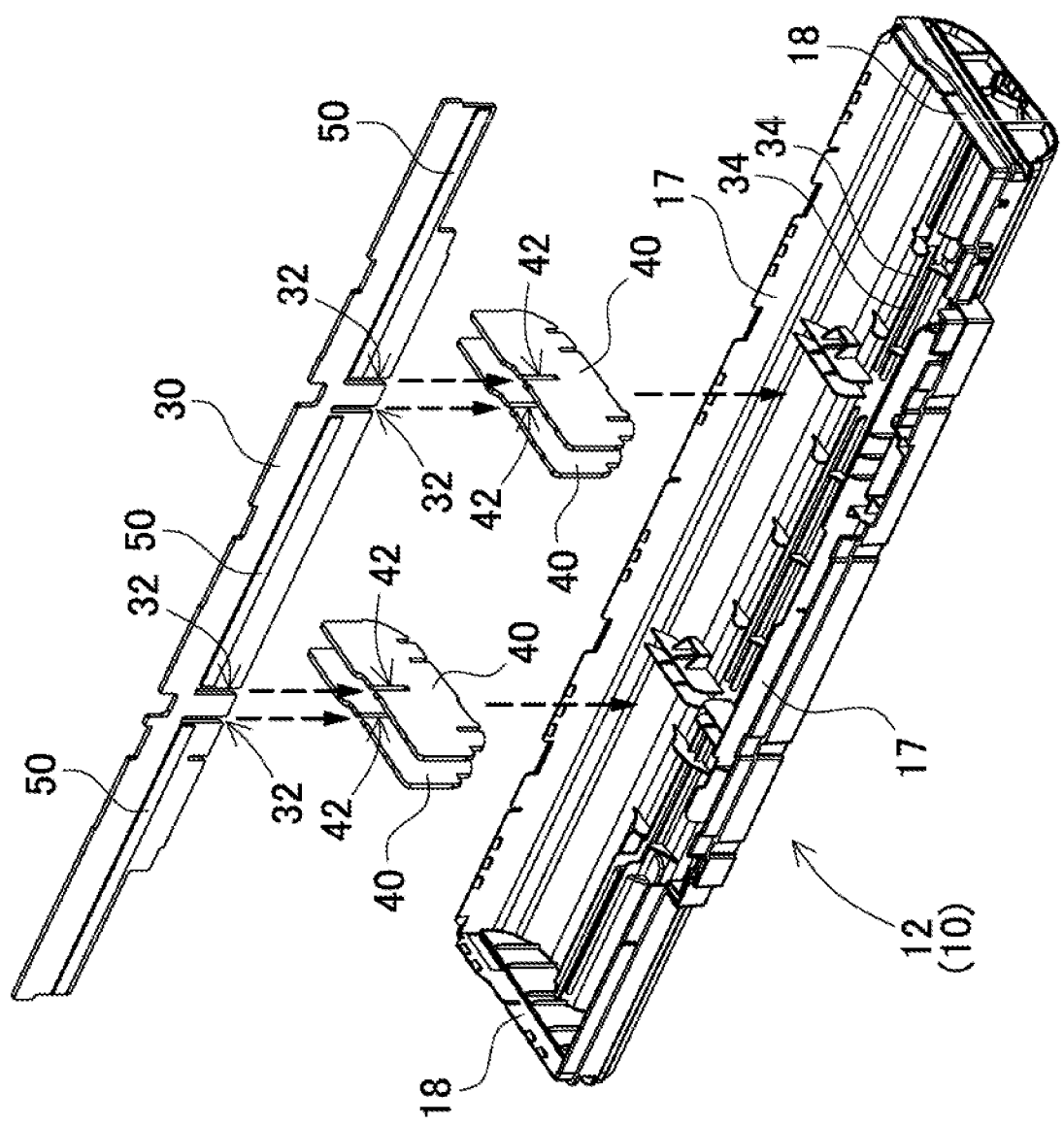
FIG. 8 is an exploded perspective view showing a state where a longitudinal partition plate and lateral partition plates are set in a housing case of FIG. 1.
Figure 9:
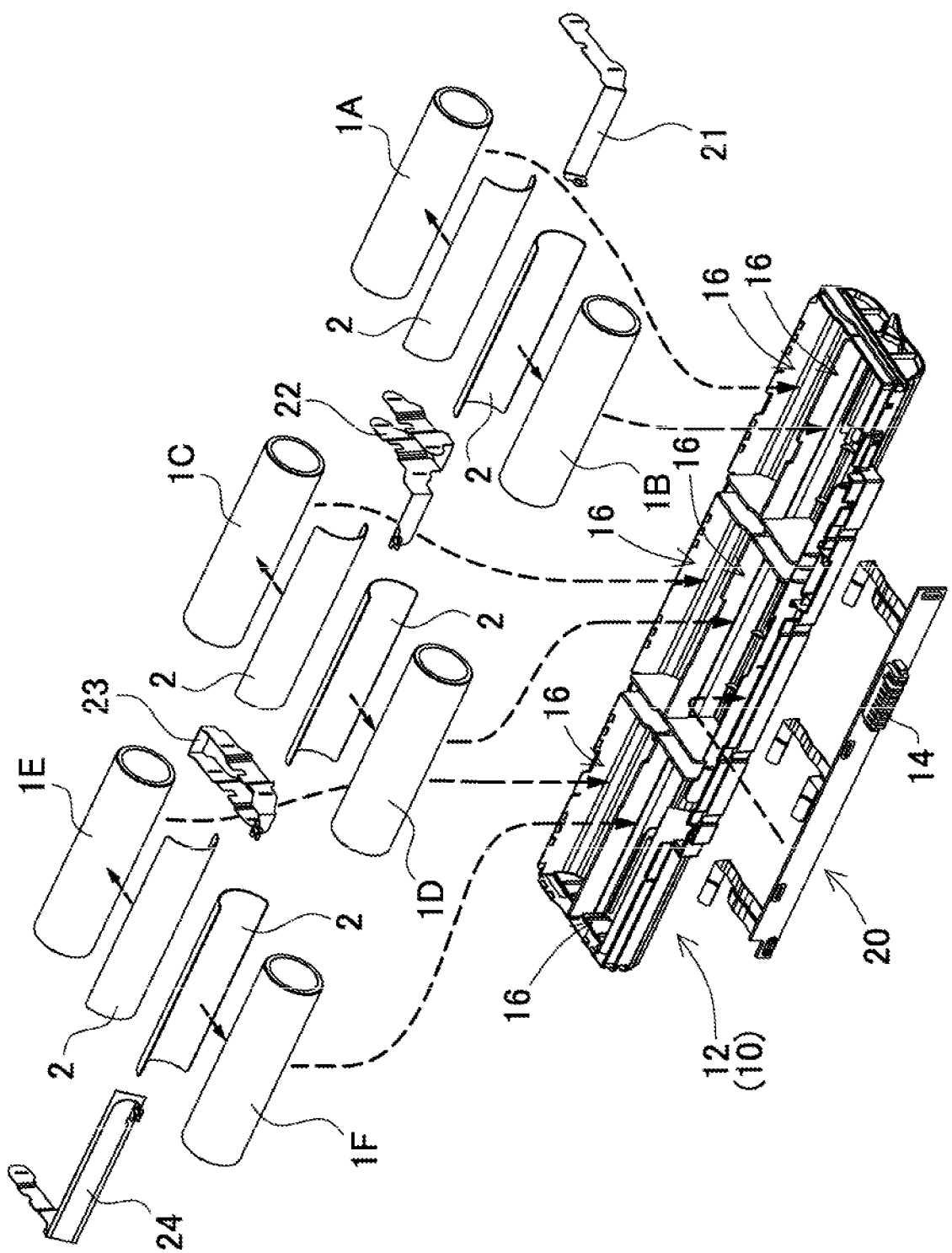
FIG. 9 is an exploded perspective view showing a state where insulating thermal resistant plates, secondary battery cells, and a circuit board are set in the battery pack of FIG. 8.

Each of FIGS. 1 to 9 shows a battery pack according to a first exemplary embodiment of the present invention. In these figures, FIG. 1 is a perspective view showing battery pack 100 according to the first exemplary embodiment, FIG. 2 is a perspective view of battery pack 100 of FIG. 1 as obliquely viewed from below, FIG. 3 is a cross-sectional view of battery pack 100 of FIG. 1 taken along line III-III, FIG. 4 is a sectional view of battery pack 100 of FIG. 1 taken along line IV-IV, FIG. 5 is an exploded perspective view of battery pack 100 of FIG. 1, FIG. 6 is a perspective view showing a state of battery pack 100 of FIG. 1 from which cover 11 is removed, FIG. 7 is a plan view of battery pack 100 of FIG. 6, FIG. 8 is an exploded perspective view showing a state where longitudinal partition plate 30 and lateral partition plates 40 are set in housing case 10 in FIG. 1, and FIG. 9 is an exploded perspective view showing a state where insulating thermal resistant plates 2, secondary battery cells 1, and circuit board 20 are set in battery pack 100 of FIG. 8. Battery pack 100 houses a plurality of secondary battery cells 1 inside, and connects secondary battery cells 100 in series or in parallel to achieve a capacity increase and allow charging and discharging. Power is supplied by connecting battery pack 100 to an external device corresponding to a driving target, and discharging secondary battery cells 1. Presented herein is an example where battery pack 100 is connected to an external device constituted by a laptop computer. However, the external device to which the battery pack of the present invention is connected is not limited to the laptop computer, but may be other electronic devices and electric devices, such as a cellular phone, a portable digital versatile disc (DVD) player, a portable car navigation system, and a portable music player, or an electric tool or an assisted bicycle, for example. In addition, the battery pack may be directly and detachably attached to an external device for use, or may be housed or embedded inside an external device, or may be connected via a cable or the like.

(Housing Case 10)

Battery pack 100 has a box-shaped external appearance extending in one direction as shown in FIGS. 1 and 2 and other figures. A box-shaped main body is constituted by housing case 10, and is divided into two parts, i.e., cover 11 and case body 12, as shown in FIGS. 3, 4, 5, and 6. Housing case 10 includes connector 14, and connection mechanism 13 for connecting to an electric device (a laptop computer herein) corresponding to a driving target to which power is supplied using battery pack 100. Lock mechanism 15 may be further provided to maintain an attached state of battery pack 100 to an electric device. Housing case 10 is made of a material having excellent electrical insulation and thermal insulation properties, such as polycarbonate and other resins.

As shown in FIGS. 3, 5, and 7 to 9, a plurality of secondary battery cells 1, circuit board 20, lead plates 21, 22, 23, 24, and others are housed inside housing case 10. According to this example, each of secondary battery cells 1 is constituted by a cylindrical secondary battery cell having a cylindrical exterior can. Secondary battery cells 1 herein are constituted by six secondary battery cells, i.e., first secondary battery cell 1A, second secondary battery cell 1B, third secondary battery cell 1C, fourth secondary battery cell 1D, fifth secondary battery cell 1E, and six secondary battery cell 1F. Two battery rows, each constituted by three of these cells connected in series, are connected in parallel. A number and a connection form of the secondary battery cells may be freely varied. For example, in a case of battery pack 200 according to a second exemplary embodiment shown in FIGS. 26 and 27 and other figures and described below, four secondary battery cells 1A, 1B, 1C, 1D are provided such that two sets of the cells are arranged in series and in parallel.

Each of secondary battery cells 1 having a cylindrical shape is a lithium ion secondary battery. However, each of the secondary battery cells having a cylindrical shape may be constituted by a chargeable/dischargeable secondary battery such as a nickel metal hydride battery and a nickel-cadmium battery, especially a battery that generates high-temperature heat in a use state.

In addition, secondary battery cells A, 1B, 1C, 1D, 1E, 1F are electrically connected to each other in series or in parallel by lead plates 21, 22, 23, 24. Each of lead plates 21, 22, 23, 24 is produced by bending a metal sheet having excellent conductivity. Lead plates 21, 22, 23, 24 are welded to electrodes on end surfaces of secondary battery cells 1A, 1B, 1C, 1D, 1E, 1F. Moreover, total + and total − of a battery assembly constituted by secondary battery cells 1A, 1B, 1C, 1D, 1E, F connected to each other are connected to circuit board 20. A charge/discharge circuit and a protection circuit are mounted on circuit board 20. Furthermore, an intermediate potential lead wire for measuring intermediate potential, or potential of a temperature detector for detecting each temperature of secondary battery cells 1 may be connected to circuit board 20 to recognize each voltage of secondary battery cells 1. A thermistor or the like is used as the temperature detector. According to the example of FIG. 9 and other figures, connector 14 is directly connected to circuit board 20, and is disposed in a vertical posture on a side surface side of housing case 10.

(Longitudinal Partition Plate 30)

In addition, as shown in FIG. 9, battery housing spaces 16 are partitioned inside housing case 10 to house secondary battery cells 1. Longitudinal partition plate 30 and lateral partition plates 40 are disposed in housing case 10 to partition battery housing spaces 16. Longitudinal partition plate 30 extends in a longitudinal direction of housing case 10. That is, longitudinal partition plate 30 is disposed substantially parallel to side walls 17 and substantially at a center between side walls 17 to divide an internal space of housing case 10 into two parts. Side walls 17 are located on both sides extending in the longitudinal direction of housing case 10. Longitudinal partition plate 30 is made of a material having excellent electrical insulation and thermal insulation properties, such as mica.

(Lateral Partition Plate 40)

On the other hand, lateral partition plates 40 extend in a lateral direction of housing case 10, that is, substantially parallel to end walls 18 located at both ends of housing case 10 in the longitudinal direction, and are disposed in such positions as to divide the internal space of housing case 10 into three parts in the longitudinal direction of housing case 10 between end walls 18. Each of lateral partition plates 40 is made of a material having excellent electrical insulation and thermal insulation properties. Each of lateral partition plates 40 is preferably made of mica. Mica is highly flame-retardant and non-flammable, has an excellent electrical insulation property, and is relatively inexpensive, and therefore is suitable for a part requiring thermal insulation and electrical insulation properties.

Slits are formed in the respective partition plates to allow longitudinal partition plate 30 lateral partition plates 40 to cross each other in right-angled postures. Longitudinal partition plate 30 has longitudinal side slits 32, while each of lateral partition plates 40 has lateral side slit 42. Each width of the slits is made slightly larger than a thickness of the other partition plate crossing the corresponding slit.

In this manner, the internal space of housing case 10 is divided into six parts as shown in FIGS. 8 and 9 by combining longitudinal partition plate 30 and lateral partition plates 40 to partition battery housing spaces 16 in each of which corresponding secondary battery cell 1 is housed. Secondary battery cells 1 housed in corresponding battery housing spaces 16 formed individually are physically separated from each other. As a result, electrical insulation and thermal insulation between secondary battery cells 1 are achieved.

According to the example described above, one longitudinal partition plate 30 disposed in parallel to the longitudinal direction is used to divide the internal space of housing case 10 into two parts in the lateral direction. However, the present invention is not limited to this configuration. Two or more longitudinal partition plates may be used to divide the internal space of the housing case into three or more parts. Similarly, according to the example described above, two lateral partition plates 40 disposed in parallel to the lateral direction is used to divide the internal space of the housing case into three parts. However, the present invention is not limited to this configuration. One lateral partition plate may be used to divide the internal space of the housing case into two parts, or three or more lateral partition plates may be used to divide the internal space of the housing case into four or more parts.

Moreover, while the plurality of battery housing spaces 16 are formed by dividing the internal space of housing case 10 in this manner, a number of secondary battery cells need not necessarily be equalized with a number of the battery housing spaces. The number of the secondary battery cells may be smaller than the number of the battery housing spaces. For example, in the case of battery pack 200 of the second exemplary embodiment shown in FIGS. 26 and 27 and other figures, which will be described below, the number of secondary battery cells 1 is four even in a state where six battery housing spaces 16 are formed similarly to the first exemplary embodiment.

Moreover, in the case of the example of battery pack 200 according to the second exemplary embodiment, first secondary battery cell 1A, second secondary battery cell 1B, third secondary battery cell 1C, and fourth secondary battery cells 1D are used as the four secondary battery cells. In this case, battery rows each constituted by two cells connected in series are connected to each other in parallel. Specifically, two secondary battery cells, i.e., first secondary battery cell 1A and third secondary battery cell 1C are disposed such that end surfaces of these battery cells face each other to constitute a first battery row, while two secondary battery cells, i.e., second secondary battery cell 1B and fourth secondary battery cell 1D are disposed such that end surfaces of these battery cells face each other to constitute a second battery row. However, a number of series connections need not necessarily be two or more. Each of the battery rows may be constituted by one secondary battery cell and connected to each other in parallel.

(Longitudinal Side Slit 32)

Lead plates 22, 23 are also inserted into longitudinal side slits 32 as shown in FIG. 9. Longitudinal side slits 32 are therefore common slits into which lead plates 22, 23 and lateral partition plates 40 are both inserted. This configuration prevents formation of an additional gap, thereby improving safety.

When a plurality of secondary battery cells are used, any measures should be taken to enhance safety even in a case of thermal runaway of any one of the secondary battery cells for some reasons. For example, it is demanded to provide such a structure where flame does not reach or does not easily reach an adjacent secondary battery cell in a state where this flame blows out from a side surface of an exterior can of a cylindrical secondary battery cell, even while such a state is unlikely to occur in general. In this case, a longitudinal partition plate is disposed between secondary battery cells disposed such that side surfaces of these battery cells are adjacent to each other. However, a lead plate needs to be inserted to meet the requirement of electric connection between these secondary battery cells. Accordingly, it is essential to form lead slit 31X in longitudinal partition plate 30X as a slit through which lead plate 21X is inserted as in a battery pack according to Comparative Example 1 shown in FIG. 10. Moreover, lead slit 31X becomes thicker than the lead plate in accordance with manufacturing tolerances and processing accuracy. As a result, a gap is produced in lead slit 31X even with the lead inserted into lead slit 31X. Therefore, if flame blows out from a side surface of one secondary battery cell as a result of thermal runaway, the flame is considered to pass through lead slit 31X and flow into a battery housing space of an adjacent secondary battery cell as indicated by arrows in FIG. 10. Furthermore, as shown in a perspective view of FIG. 11, lateral slit 32X needs to be formed in longitudinal partition plate 30X to allow lateral partition plate 40X to cross long partition plate 30X. In this case, flame may also flow from this gap.

Figure 12:
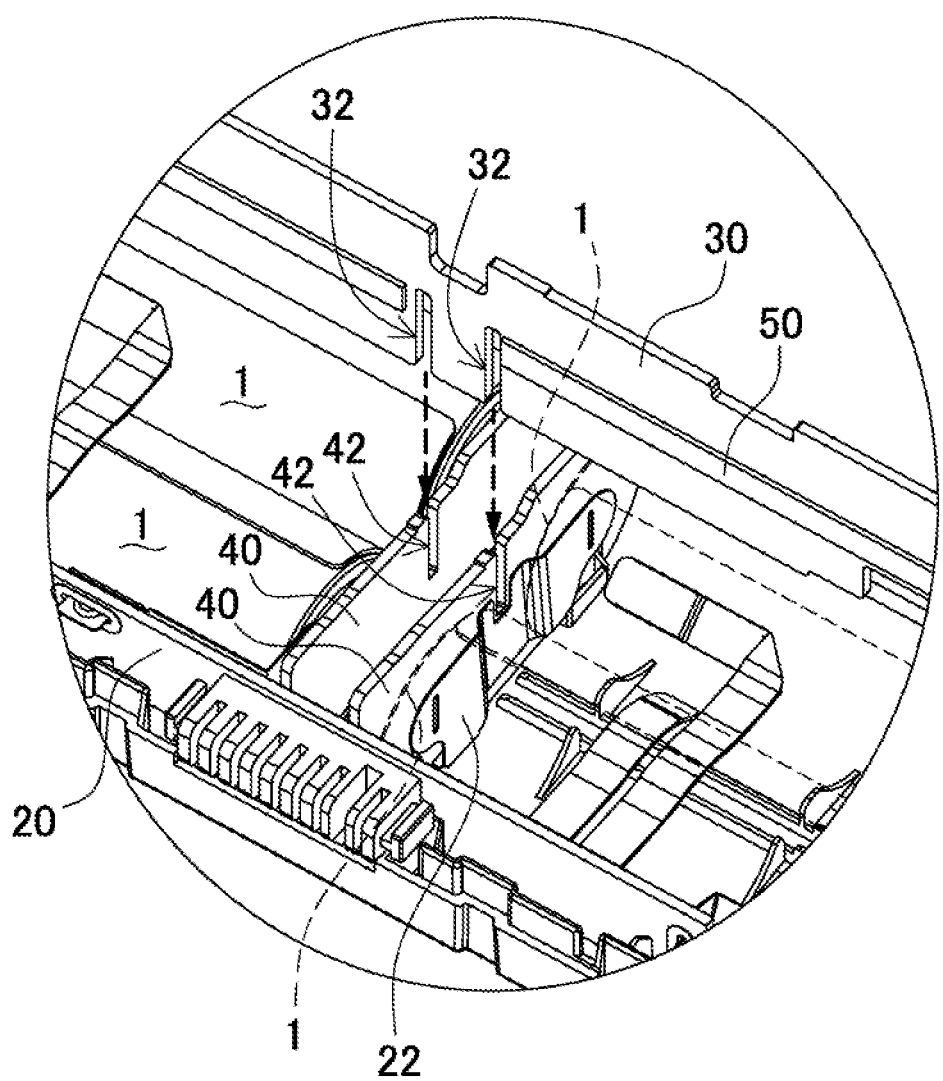
FIG. 12 is a schematic view showing longitudinal side slits of the battery pack according to the first exemplary embodiment.
Figure 13:
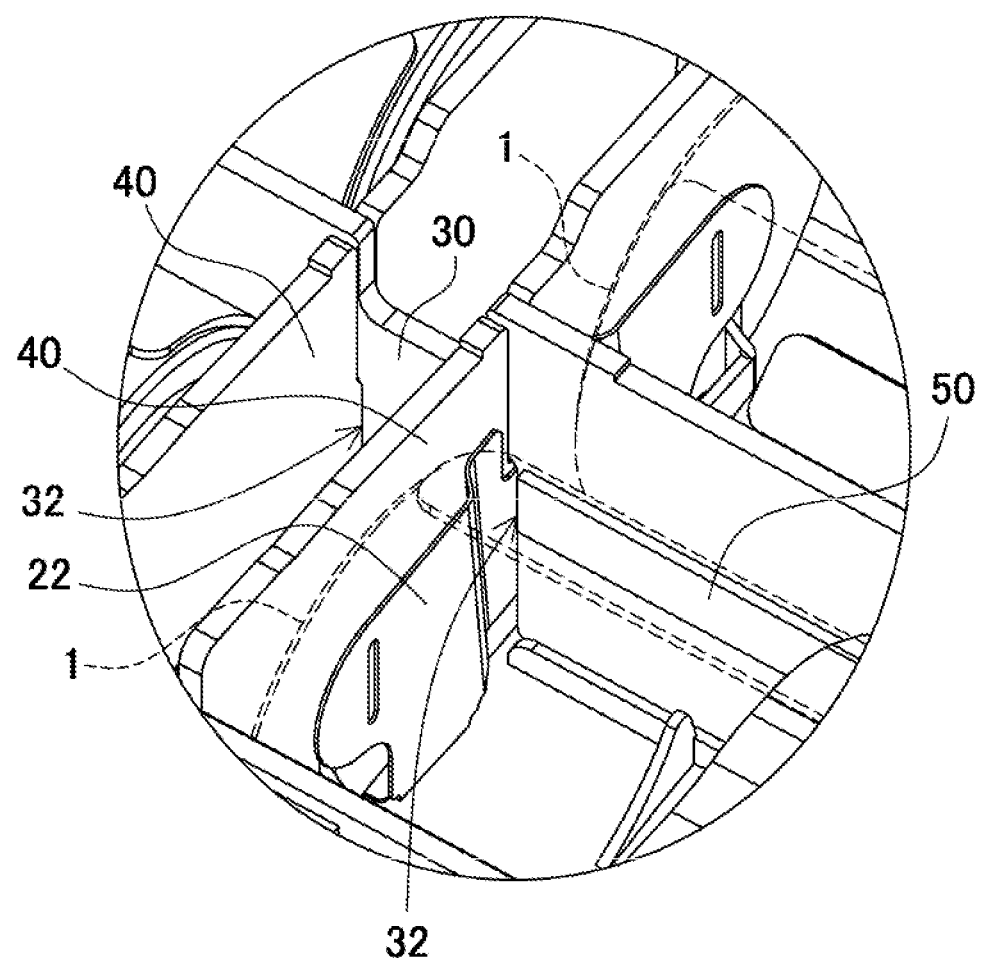
FIG. 13 is a schematic diagram showing a state where the secondary battery cell is removed in a state where the lateral partition plate and a lead plate are inserted through the longitudinal side slit of FIG. 12.

According to the first exemplary embodiment, therefore, the slits common to lead plate 22 and lateral partition plate 40 are formed, and lead plates 22, 23 and lateral partition plates 40 are integrally inserted through the slits to reduce a gap and thereby reduce a space that may become a flame exhausting path. Specifically, as shown in FIG. 12, longitudinal side slit 32 is formed on a lower side of longitudinal partition plate 30 as shown in FIG. 12. Lead plate 22 and lateral partition plate 40 are inserted into longitudinal side slit 32 thus formed as shown in FIG. 13. This configuration limits the gap of longitudinal side slit 32 using lead plate 22 and lateral partition plate 40, thereby reducing the flame exhausting path and improving safety as shown in FIG. 14.

Figure 10:
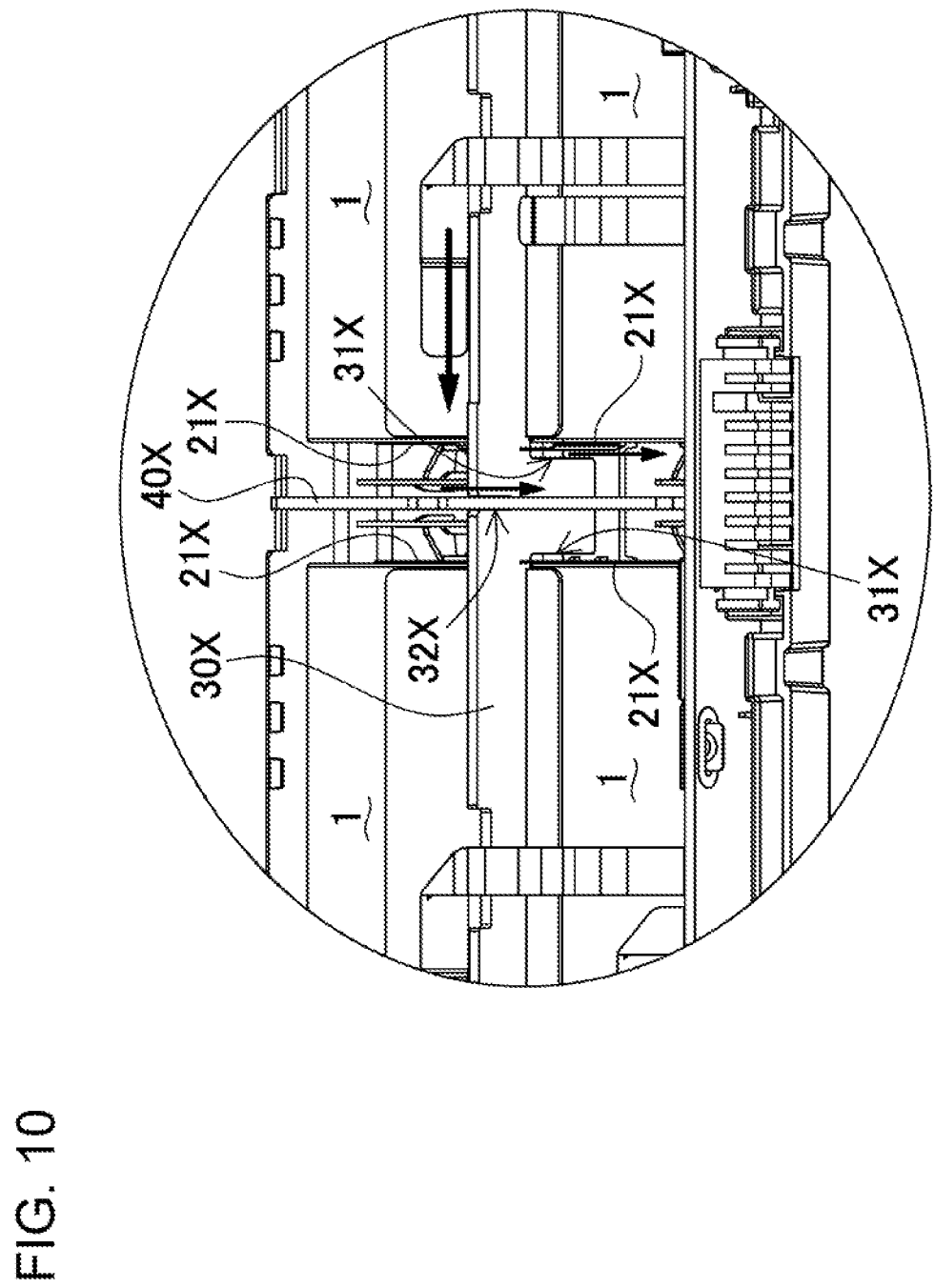
FIG. 10 is a schematic diagram showing a flame exhausting path of a battery pack according to Comparative Example 1.
Figure 11:
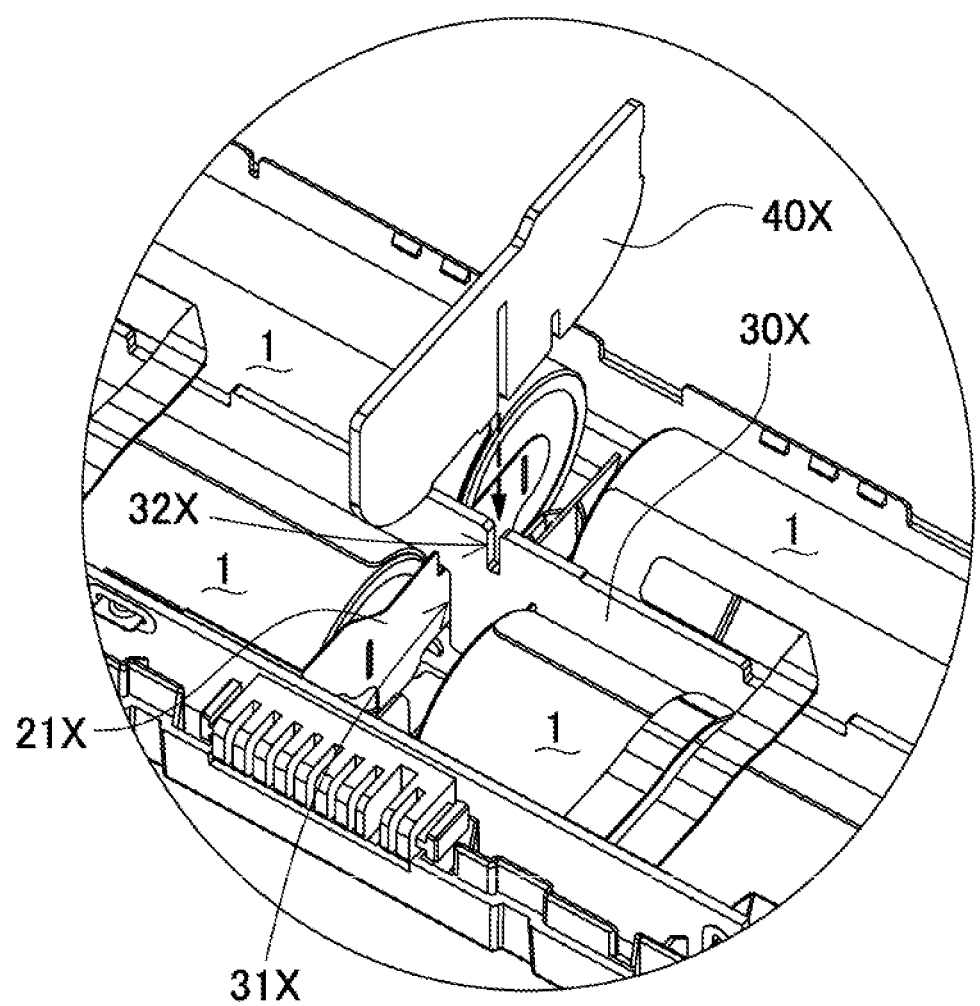
FIG. 11 is a schematic diagram showing another flame exhausting path of the battery pack according to Comparative Example 1.
Figure 14:
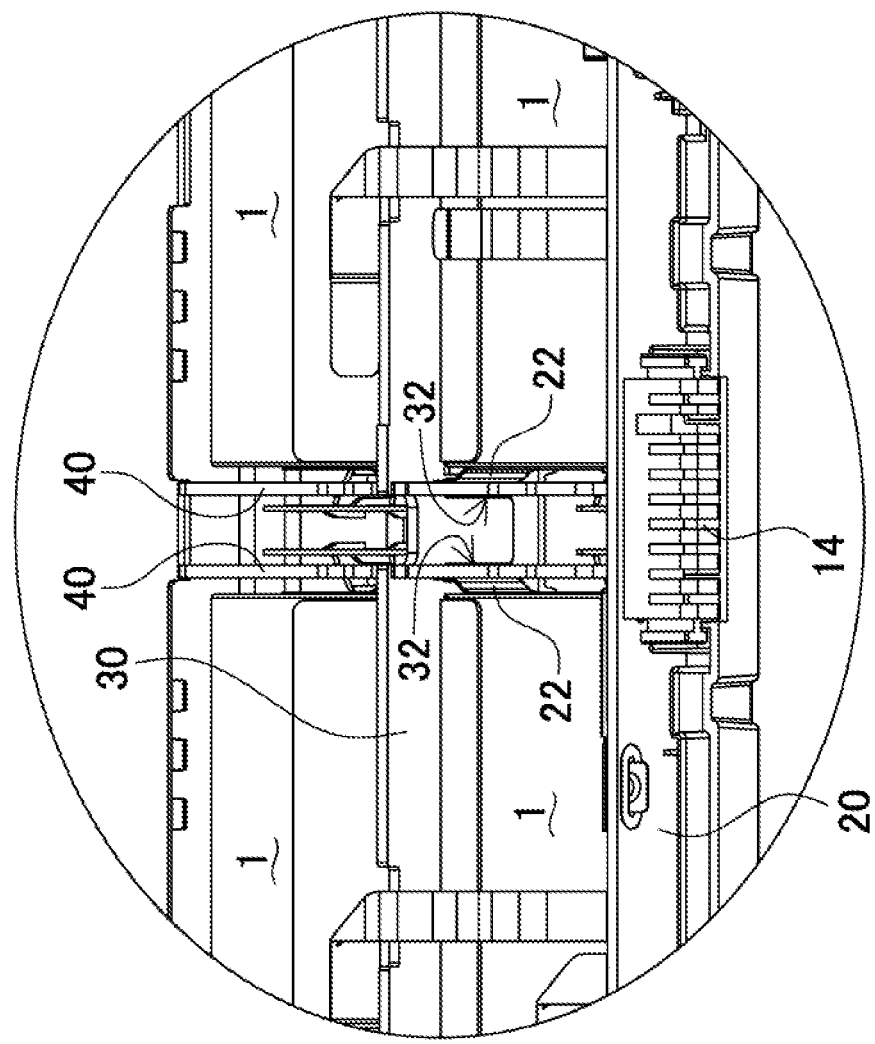
FIG. 14 is a schematic view showing a state where the secondary battery cells are shown in FIG. 13.
Figure 15A:
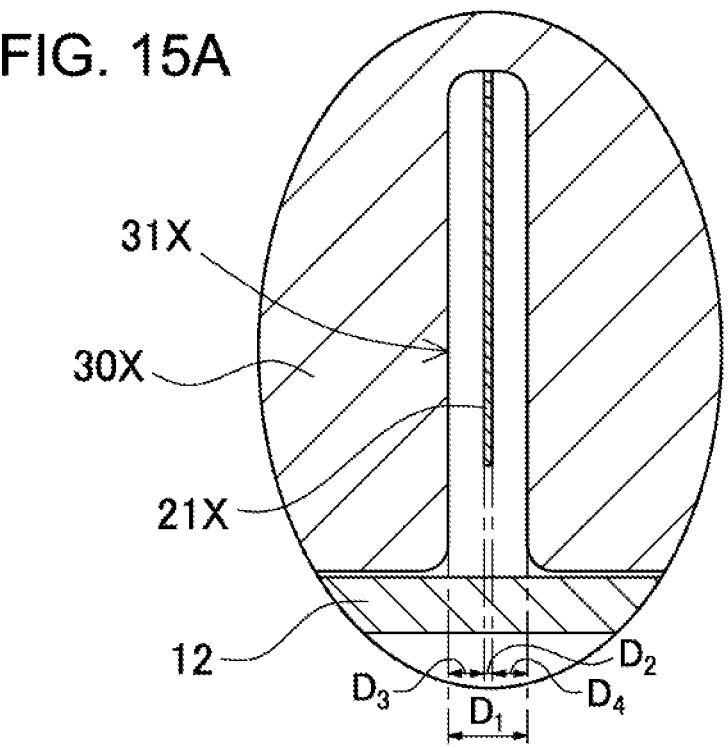
FIG. 15A is a schematic cross-sectional view showing the lead slit of FIG. 10.
Figure 15B:
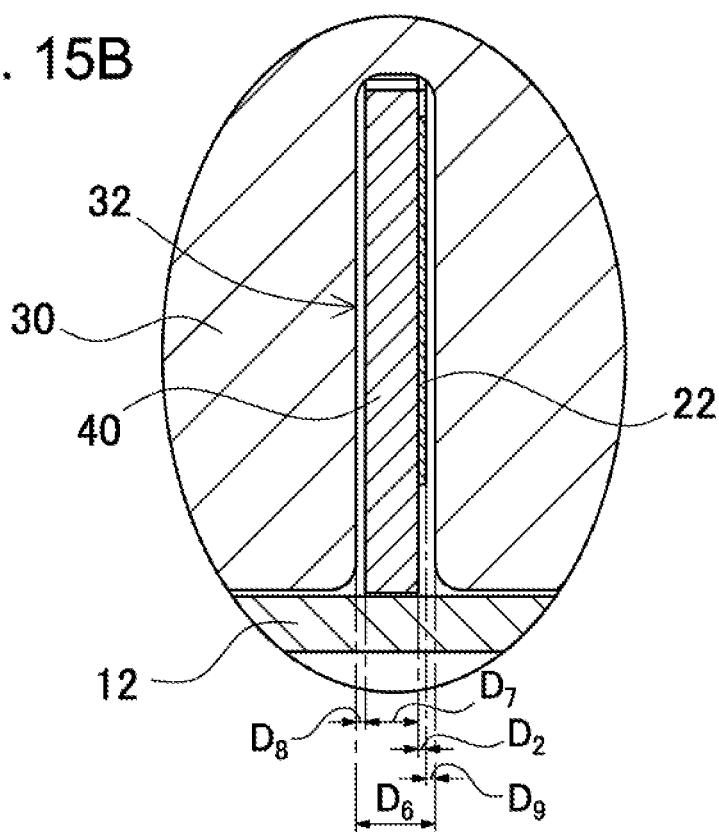
FIG. 15B is a schematic cross-sectional view showing the longitudinal side slit of FIG. 14.

FIG. 15A shows lead slit 31X of FIG. 10, while FIG. 15B shows longitudinal side slit 32 of FIG. 14 herein. When longitudinal partition plate 30X is made of mica in FIG. 15A, for example, a width of lead slit 31X is set to D1 mm in accordance with processing accuracy of mica. When lead plate 22 is constituted by a metal sheet made of nickel or the like, gap D3+D4 becomes D1−D2 mm on an assumption that a thickness of the metal sheet is D2 mm. On the other hand, it is assumed that longitudinal partition plate 30 in FIG. 15B is similarly made of mica, that a width of longitudinal side slit 32 is D6 mm, and that the thickness of lead plate 22 is D2 mm. When a thickness of lateral partition plate 40 is D7 mm, a gap D8+D9 becomes D6−D2−D7 mm (in a case where a gap between lead plate 22 and lateral partition plate 40 is present, this gap is included in D8+D9). A length of the gap D8+D9 herein is much smaller than a length of the gap D3+D4. Sufficient reduction of the gap in this manner reduces the flame exhausting path, thereby further decreasing a possibility of fire spread, and improving safety. In addition, lateral partition plate 40 thicker than lead plate 22 is overlapped and integrated with lead plate 22. This configuration produces such an advantage that lead plate 22 is stably held in longitudinal side slit 32.

In addition, according to the example shown in FIGS. 12 to 14, two lateral partition plates 40 are separately disposed. Even if flame blows out from an end surface of one of the secondary battery cells in this configuration, damage to another battery cell adjacent to this secondary battery cell in the end surface direction is avoidable by using two lateral partition plates 40. Furthermore, a thermal insulation effect of an air layer can be also produced by a space formed between two lateral partition plates 40. Accordingly, thermal insulation performance also improves.

Figure 24:
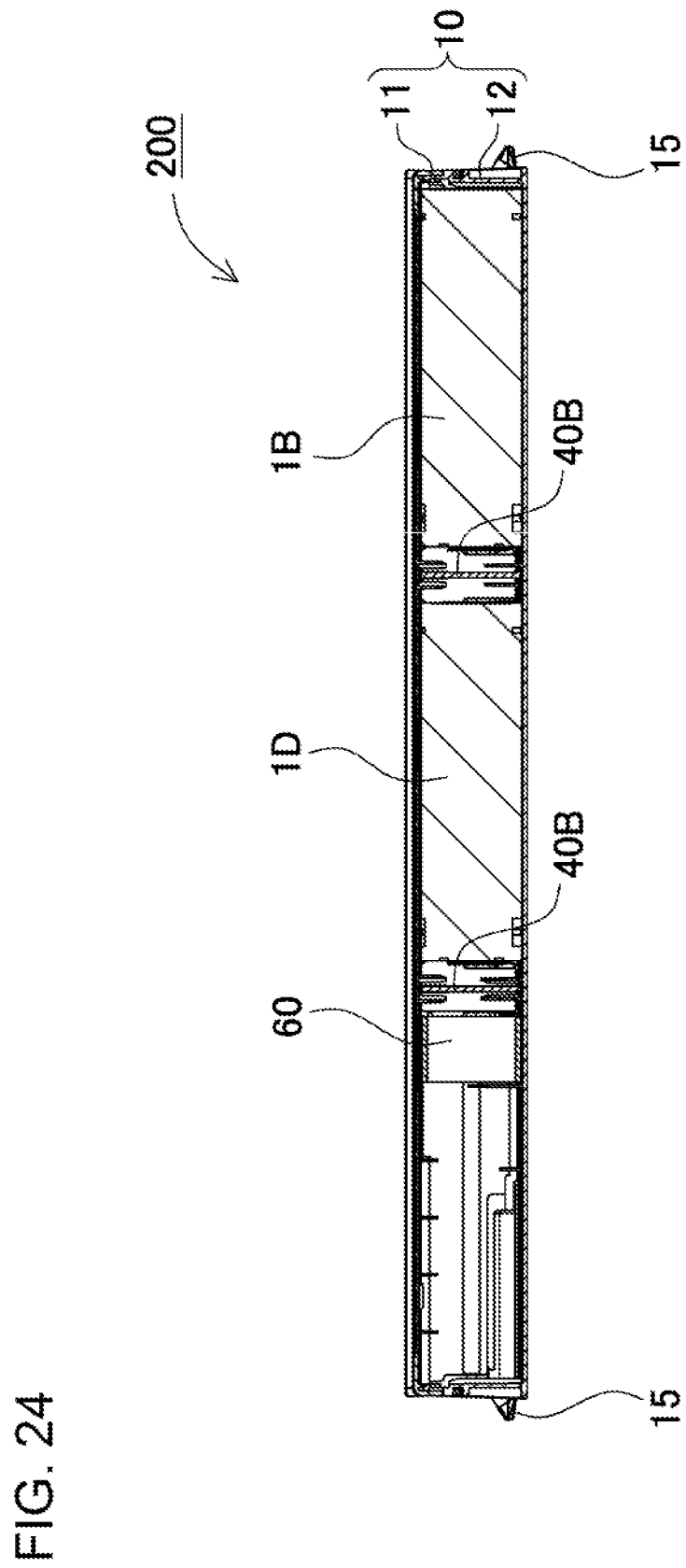
FIG. 24 is a cross-sectional view taken along line XXIV-XXIV in FIG. 23.
Figure 25:
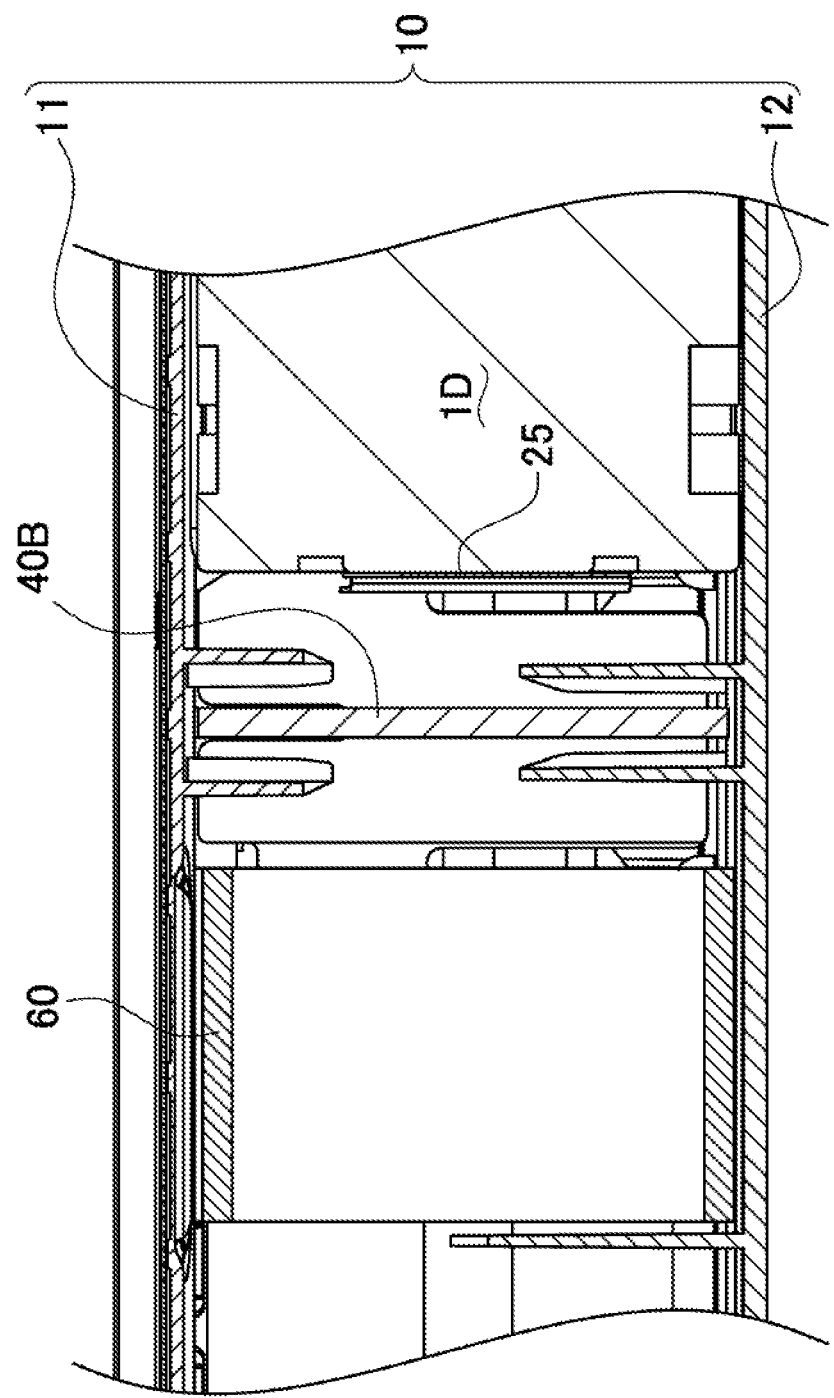
FIG. 25 is an enlarged cross-sectional view of FIG. 24.

Note that a number of lateral partition plates 40 for defining battery housing spaces 16 is adjustable according to required thermal insulation performance. Accordingly, three or more plates may be provided or only one plate may be provided. For example, only one plate is provided in the secondary exemplary embodiment described below as shown in FIGS. 24 and 25, and other figures.

(Rib)

A pair of ribs for holding longitudinal partition plate 30 are further formed on the inner surface of housing case 10. Specifically, as shown in a cross-sectional view of FIG. 3, a pair of ribs 34 extending in the longitudinal direction are provided upright on the inner surface of case body 12 of housing case 10 at a substantially central position. Each of ribs 34 is formed integrally with case body 12 and cover 11. A lower end of longitudinal partition plate 30 is inserted between the pair of ribs 34 to hold longitudinal partition plate 30 inside housing case 10.

(Adhesive Material 36)

In addition, an interface between the respective ribs and longitudinal partition plate 30 is filled with flame-retardant adhesive material 36. A gap between the ribs and longitudinal partition plate 30 is filled in this manner to avoid such a situation where flame exhaust possibly produced during thermal runaway of the secondary battery cell reaches the adjacent secondary battery cell.

Figure 16:
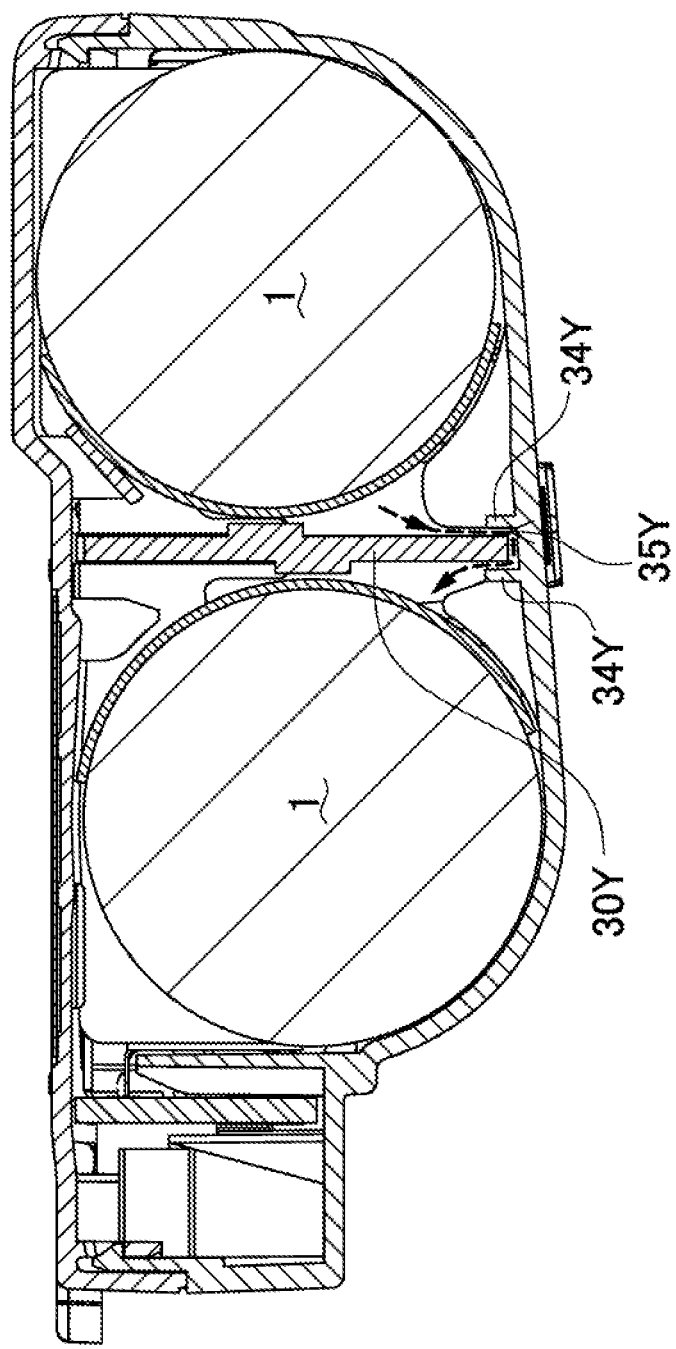
FIG. 16 is a schematic cross-sectional view showing a flame exhausting path of a battery pack according to Comparative Example 2.

As described above, longitudinal partition plate 30 is disposed between the side surfaces of the secondary battery cells to prevent damage to the adjacent different secondary battery cell by using longitudinal partition plate 30 even when one of the secondary battery cells causes thermal runaway and blows out flame or high-pressure gas toward the side surface. On the other hand, as in a battery pack according to Comparative Example 2 shown in a cross-sectional view of FIG. 16, flame is considered to leak toward an adjacent secondary battery cell through gap 35Y when gap 35Y is present at a connecting portion between ribs 34Y and longitudinal partition plate 30Y.

Therefore, as shown in a cross-sectional view of FIG. 3, a gap between ribs 34 and the lower end of longitudinal partition plate 30, and an upper end of longitudinal partition plate 30 are filled with flame-retardant adhesive material 36 to fill the gap. This configuration reduces the gap between ribs 34 and longitudinal partition plate 30, thereby preventing formation of a path for flame exhaust or the like. Flame-retardant adhesive material 36 may be made of silicone resin or the like. A temporary sealing effect is produced by filling the gap with adhesive material 36 thus provided. In particular, blowout of flame and high-pressure gas generally continues for a short period of approximately a few seconds. In this case, direct exposure of the adjacent secondary battery cell to flame or high-pressure gas is avoidable if strength of the flame or the high-pressure gas is reduced. Accordingly, sufficient fire spread preventing effect is expected to be achieved.

(Insulating Thermal Resistant Plate 2)

In addition, the side surface of each of the secondary battery cells is covered with insulating thermal resistant plate 2. Insulating thermal resistant plates 2 are provided so as to cover at least opposing regions of respective side faces of secondary battery cells 1 disposed adjacent to each other such that these side faces face each other. Each of insulating thermal resistant plates 2 is curved along the side surface of corresponding secondary battery cell 1. According to this configuration, each of insulating thermal resistant plates 2 is capable of covering corresponding secondary battery cell 2 along the side surface in a posture easily coming into close contact with the side surface, thereby efficiently improving a thermal insulation property in a limited space.

Figure 17A:
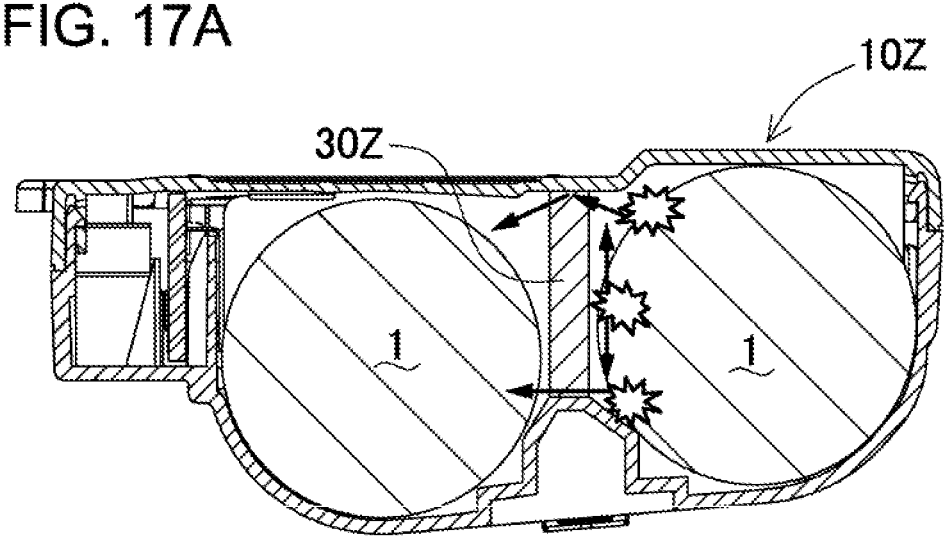
FIG. 17A is a schematic cross-sectional view showing a flame exhausting path of a battery pack according to Comparative Example 3.

When flame is exhausted from the side surface in a state where the secondary battery cells are disposed in parallel, the flame is considered to flow into adjacent secondary battery cell 1 through a gap between longitudinal partition plate 30Z and housing case 10Z as in a battery pack according to Comparative Example 3 shown in a cross-sectional view of FIG. 17A. An exhausting path is considered to be formed as a route through which flame leaks through a gap between housing case 10Z and longitudinal partition plate 30Z in areas above and below longitudinal partition plate 30Z, depending on a flame exhaust position.

Figure 17B:
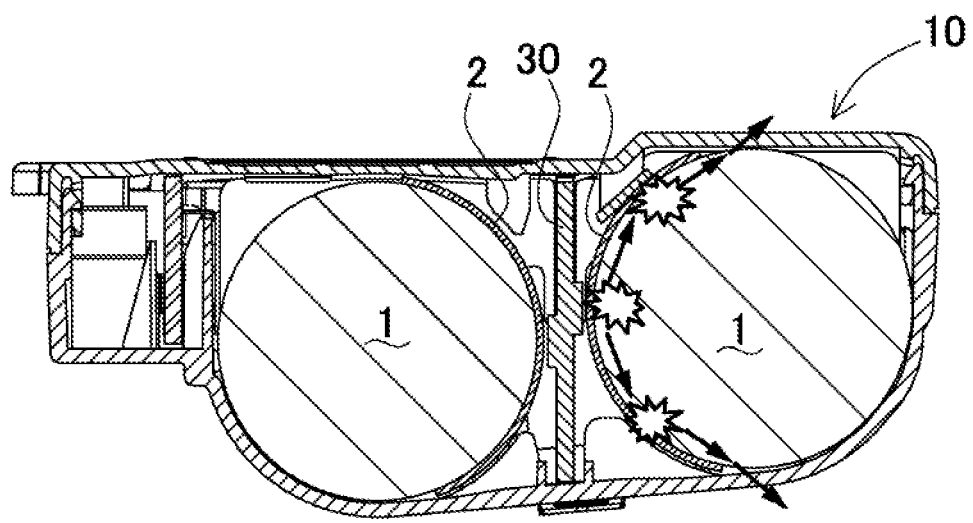
FIG. 17B is a schematic cross-sectional view showing a flame exhausting path of the battery pack according to the first exemplary embodiment.

On the other hand, in a configuration where insulating thermal resistant plate 2 which is curved as shown in FIG. 17B is provided, flame exhaust possibly caused is not directed toward adjacent secondary battery cell 1, but toward the opposite side in the housing case 10 by curved insulating thermal resistant plate 2. This configuration prevents direct exposure of adjacent secondary battery cell 1 to high-temperature flame or gas, thereby preventing fire spread or fire catch.

Each of insulating thermal resistant plates 2 shown in FIG. 3 and other figures is curved in a U shape around a position where a pair of secondary battery cells 1 come closest to each other in a cross-sectional view. In this case, a flame exhaust direction can be regulated such that flame exhaust caused by secondary battery cell 1 flows not toward the side surface but toward a rear side in an up-down direction. Accordingly, safety improves.

In addition, each of insulating thermal resistant plates 2 may contain a fibrous material. Moreover, each of insulating thermal resistant plates 2 is constituted by a plate member made of an inorganic material. It is preferable that each of insulating thermal resistant plates 2 is made of mica. This configuration achieves high thermal resistance at low cost.

(Thermal Insulator 50)

In addition, longitudinal partition plate 30 constitutes thermal insulator 50. According to the example shown in the cross-sectional views of FIG. 3 and FIG. 18, first thermal insulator 51 is provided on a side facing a side surface of the cylindrical shape of first secondary battery cell 1A on the right side, and projects to come into contact with this side surface of the cylindrical shape. In addition, second thermal insulator 52 is provided on a side facing a side surface of a cylindrical shape of second secondary battery cell 1B on the left side, and projects to come into contact with this side surface of the cylindrical shape. This configuration brings a partially projected portion of longitudinal partition plate 30 into contact with the side surface of the cylindrical shape of the secondary battery cell, thereby separating longitudinal partition plate 30 from the secondary battery cell to form an air layer which improves a thermal insulation property.

Figure 19:
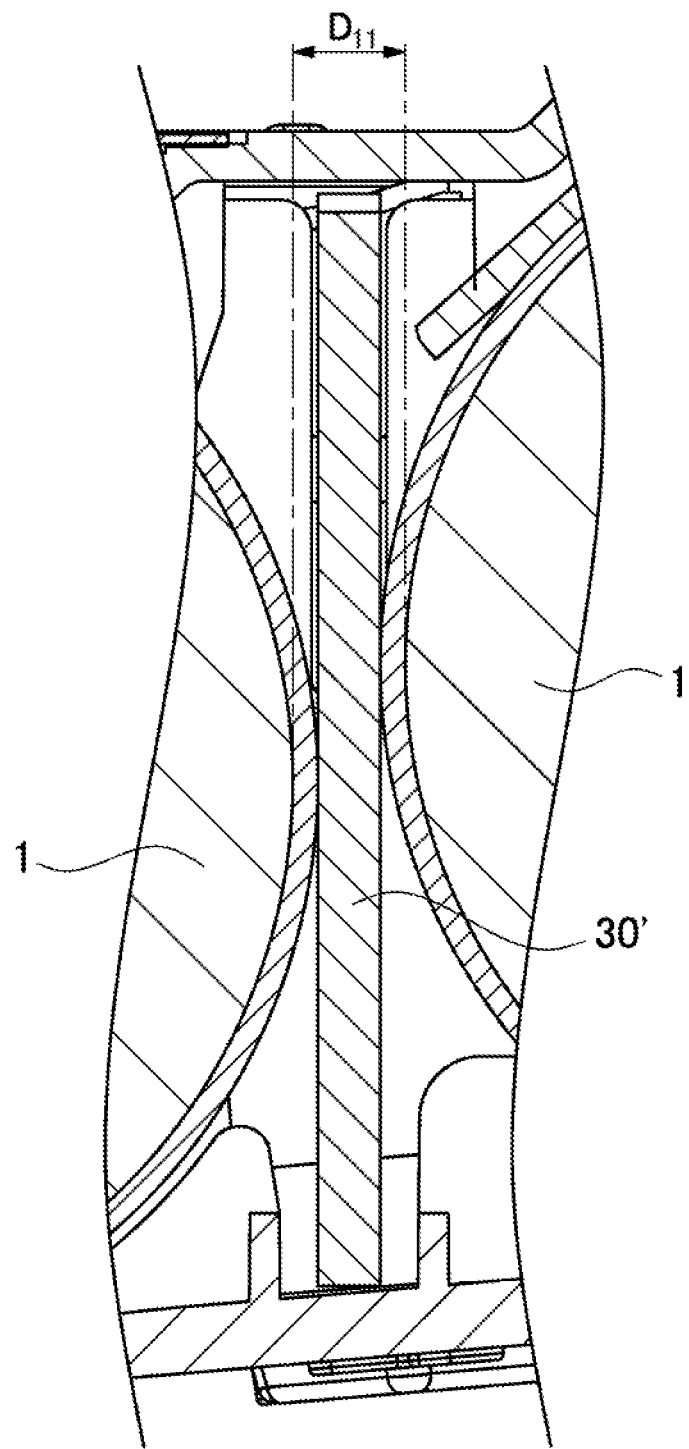
FIG. 19 is an enlarged cross-sectional view showing a longitudinal partition plate of a battery pack according to Comparative Example 4.

When thermal runaway is caused by one of secondary battery cells 1 disposed in parallel to each other inside housing case 10 such that the side surfaces of the cylindrical shapes are adjacent to each other, heat is considered to be transferred via longitudinal partition plate 30' interposed between adjoining secondary battery cells 1 as in a battery pack according to Comparative Example 4 shown in FIG. 19. For preventing this situation, methods such as use of a longitudinal partition plate made of a material having higher thermal insulation performance, and a thickness increase are considered to be adopted. However, the material change or the film thickness increase may raise costs. Particularly, the film thickness increase raises a weight of the longitudinal partition plate and therefore is not preferable for the battery pack for which size and weight reduction are demanded.

Figure 18:
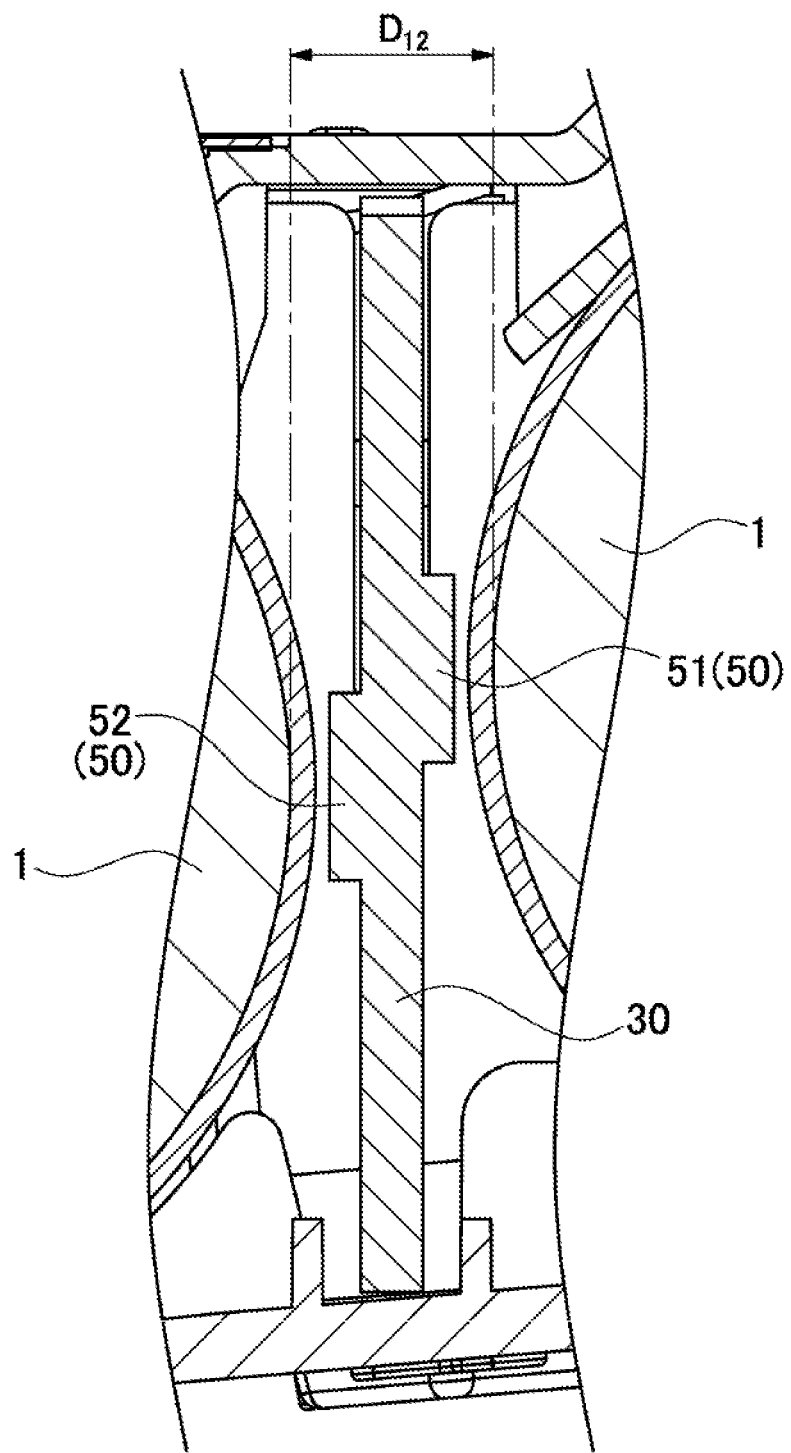
FIG. 18 is an enlarged cross-sectional view showing the longitudinal partition plate of the battery pack according to the first exemplary embodiment.

Therefore, as shown in FIG. 18, battery pack 100 according to the first exemplary embodiment includes thermal insulator 50 partially projected from both surfaces of longitudinal partition plate 30. This thermal insulator is disposed at a position in contact with a vicinity of a top of the side surface of the cylindrical shape of secondary battery cell 1 to make distance D12 between the secondary battery cells longer than distance D11 the secondary battery cells of a configuration including no thermal insulator as shown in FIG. 19. The air layer between the secondary battery cells enlarges by separation between the secondary battery cells. Accordingly, the enlarged air layer functions as a thermal insulating layer, thereby improving the thermal insulating effect between the secondary battery cells. Moreover, this configuration allows reduction of the thickness of the longitudinal partition plate itself, thereby contributing to weight reduction of the entire battery pack.

Thermal insulator 50 may be formed integrally with longitudinal partition plate 30, but is preferably a member separated from longitudinal partition plate 30. In this case, a material different from the material of the longitudinal partition plate is available to constitute the thermal insulator. Thermal insulator 50 is therefore allowed to be made of a material having a higher thermal insulation property than the material of longitudinal partition plate 30. Accordingly, reduction of cost and weight is achievable by providing a member exhibiting higher heat insulation not on the entire surface of longitudinal partition plate 30 but on a part of the surface. As described above, mica is preferably used as the material of thermal insulator 50 having an excellent thermal insulation property. In addition, when thermal insulator 50 is a member separated from longitudinal partition plate 30, the thermal insulator is bonded to the surface of longitudinal partition plate 30. A double-sided tape or an adhesive is used for this bonding.

Note that thermal insulator 50 may be extended in the longitudinal direction of longitudinal partition plate 30, or may be partially cut off in the longitudinal direction. In the example of FIGS. 5 and 8 and other figures, thermal insulator 50 is cut off at the portions where the longitudinal side slits 32 are formed. In addition, the thermal insulator may be extended in a slit shape as described above, or may be parts having rectangular shapes and provided separately from each other. Even when the thermal insulator is partially provided in the longitudinal direction, the thermal insulator is capable of forming a thermal insulating layer by coming into contact with the side surface of the cylindrical secondary battery cell in contact with the thermal insulator. Moreover, the volume of the thermal insulator to be used decreases, wherefore reduction of cost and weight is achievable.

In addition, first thermal insulator 51 and second thermal insulator 52 may be disposed such that centers of respective insulators 51 and 52 are shifted from each other in a left-right direction of longitudinal partition plate 30 in the cross-sectional view as shown in FIG. 18. By shifting centers of the cross sections of left and right secondary battery cells 1 from each other in the manner described above, positions of stresses applied when secondary battery cells 1 are pressed are shifted from each other in the left-right direction of longitudinal partition plate 30. Accordingly, concentration of the stresses is reduced. Moreover, while shifting the centers of the cross sections of secondary battery cells 1 from each other in the cross-sectional view, first thermal insulator 51 and second thermal insulator 52 are preferably arranged so as to partially overlap with each other in the left-right direction of longitudinal partition plate 30. In this manner, mechanical rigidity increases.

(Flame Exhausting Path Regulating Structure)

In addition, a flame exhausting path is defined according to the first exemplary embodiment. Flame or the like exhausted from the end surface of the secondary battery cell is further exhausted from battery pack 100 through the flame exhausting path. If flame exhaust is caused in a secondary battery cell, a flow direction of this flame is difficult to predict. If a secondary battery cell is located ahead in the flow direction of the flame, thermal runaway is considered to propagate as a result of fire spread or fire catch. The flame exhausting path is therefore intentionally provided to reduce unintended runaway of the secondary battery cell and control a flow of flame even if flame exhaust is caused. Specifically, even if flame exhaust is caused, the flame exhausting path provided in the battery pack collects the flame exhaust at a predetermined portion of the battery pack, and discharges the flame exhaust to the outside of the battery pack.

Figure 20:
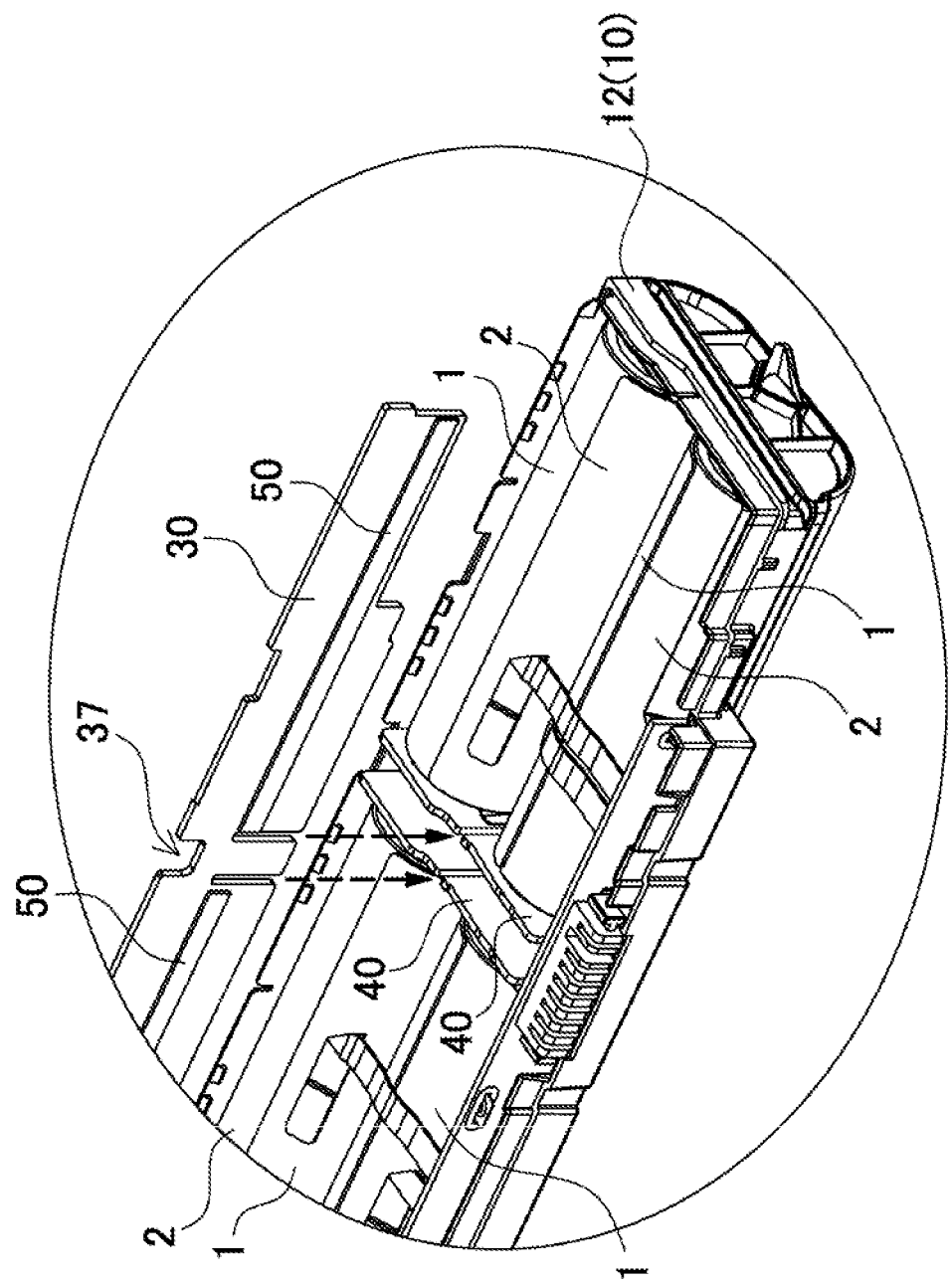
FIG. 20 is an exploded perspective view showing the longitudinal partition plate.
Figure 21:
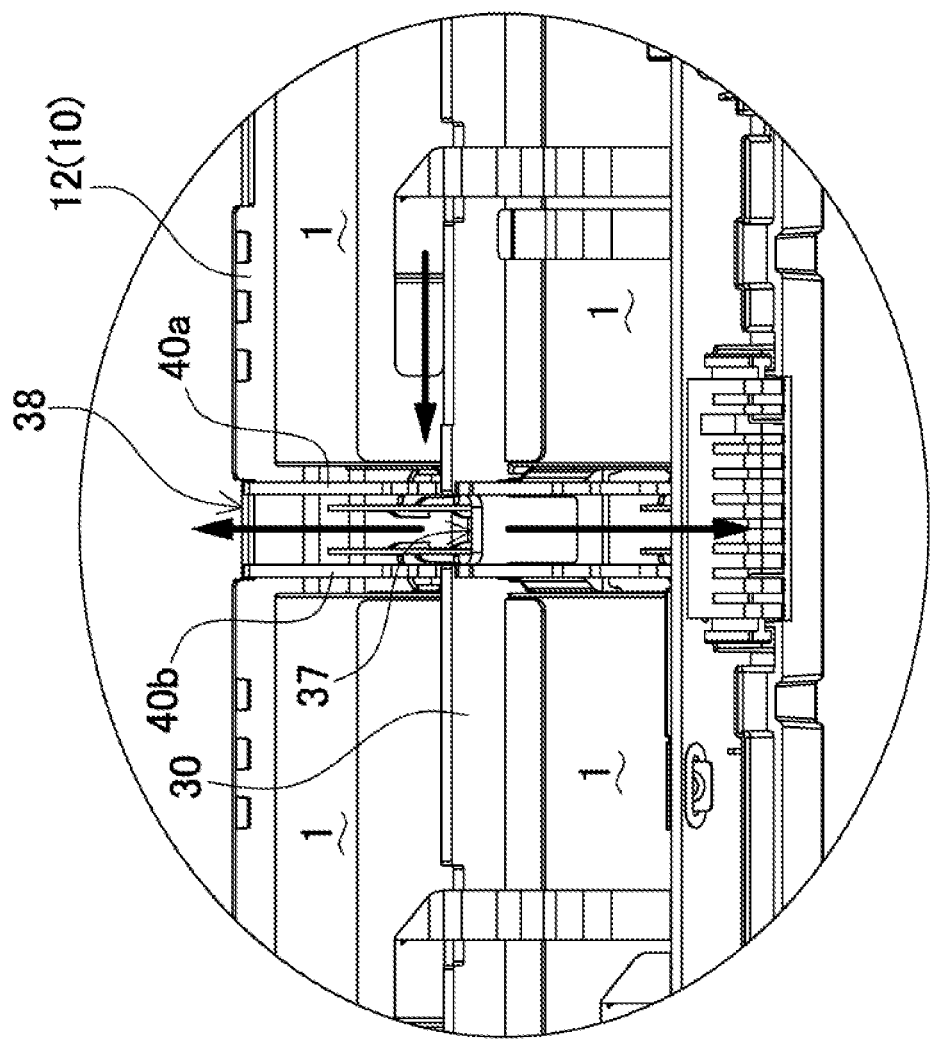
FIG. 21 is a schematic diagram showing the flame exhausting path.

As shown in FIG. 20, flame exhaust cutout 37 is formed at an upper end of longitudinal partition plate 30 as a specific flame exhausting path regulating structure. Moreover, as shown in an enlarged horizontal cross-sectional perspective view of FIG. 21 and other figures, flame exhaust port 38 is opened on each side surface of housing case 10 in the longitudinal direction in an area corresponding to a portion between two lateral partition plates 40, that is, first lateral partition plate 40a and second lateral partition plate 40b. Furthermore, as shown in an enlarged vertical cross-sectional view of FIG. 22, guide ribs 39 project downward from an inner surface of cover 11. A portion between an upper end and the inner surface of cover 11 constitutes upper cover gap 19. The flame exhausting path regulated by the flame exhausting path regulating structure in this manner will be described with reference to a schematic diagram of FIG. 21, an enlarged vertical cross-sectional view of FIG. 22, and other figures.

Figure 22:
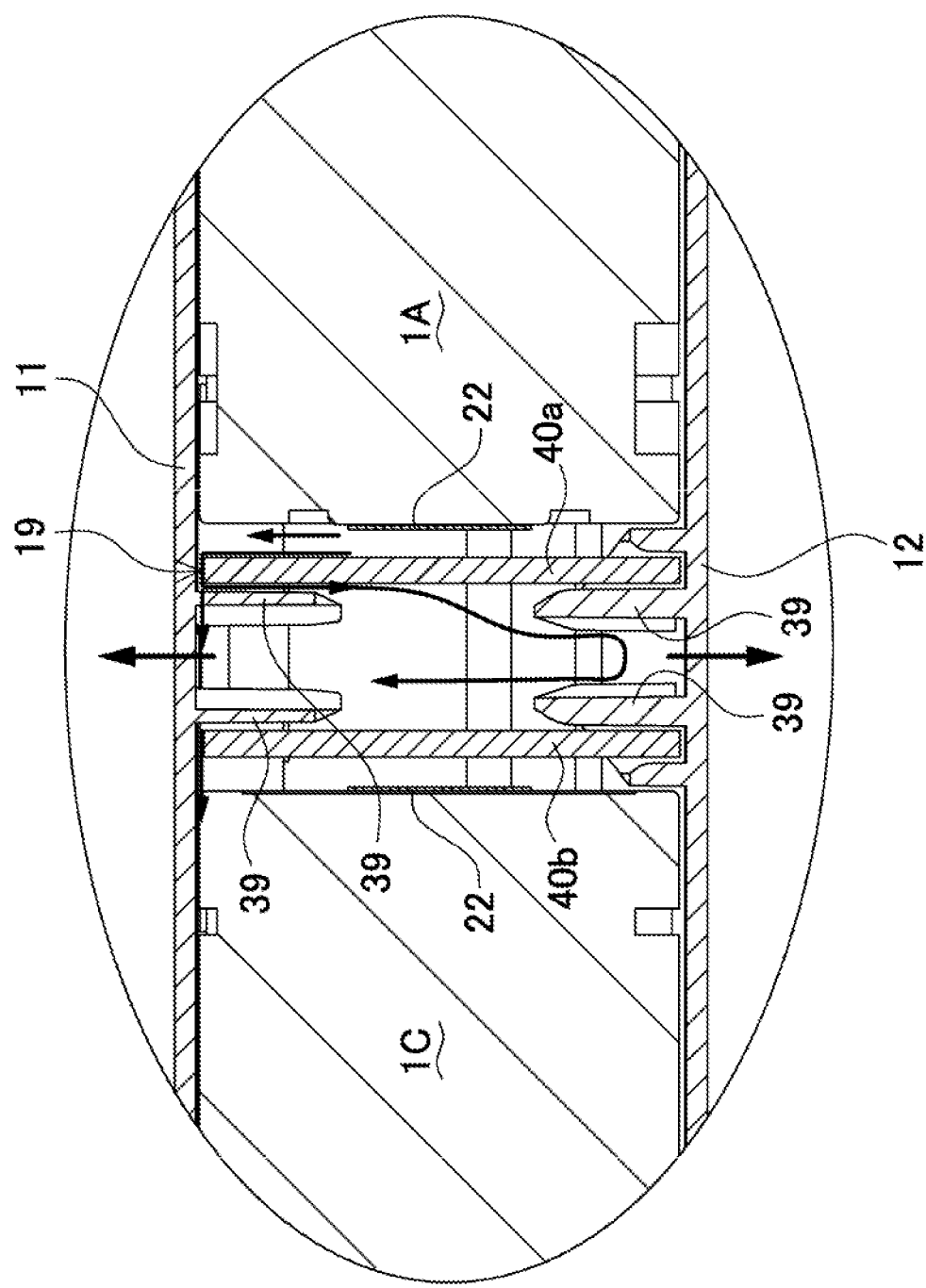
FIG. 22 is an enlarged vertical cross-sectional view showing the flame exhausting path.

As shown in the vertical cross-sectional view of FIG. 22, it is considered herein to prevent a situation that flame exhaust caused on the end surface of first secondary battery cell 1A, for example, flows toward third secondary battery cell 1C disposed such that the end surfaces of these cells face each other. First, flame blown out from the end surface of first secondary battery cell 1A tends to move along lead plate 22 and first lateral partition plate 40a facing the end surface, and tends to move upward or downward. While the upward movement of the flame is indicated by an arrow in FIG. 22 for convenience of explanation, the downward movement is basically similar movement.

The flame flowing toward upper cover gap 19 on the upper end side of first lateral partition plate 40a crosses over first lateral partition plate 40a. In this case, most of the flame passes through one of flame exhaust ports 38 or flame exhaust cutout 37, and is discharged from the other of flame exhaust ports 38 to the outside of battery pack 100. Moreover, the flame not discharged and left at this time advances along guide ribs 39 while changing a flame direction upward and downward, and again passes through one of flame exhaust port 38 or flame exhaust cutout 37 and is discharged from the other of flame exhaust ports 38 to the outside of battery pack 100. At this time, the traveling direction of the flame has already been forced to change upward and downward many times. In this case, the moving strength has been considerably lowered. Therefore, even if the flame attempts to move from the upper end of second lateral partition plate 40*b* toward third secondary battery cell 1C, most of the strength of the flame is lowered. In this case, an influence sufficient for inducing thermal runaway is not considered to be produced. Accordingly, even if flame blows out, a flow of the flame in an unintended direction is avoidable by regulating the flame exhausting path, and is safely discharged from the battery pack to the outside. In this manner, safety improves by effectively reducing a chain of thermal runaway.

Second Exemplary Embodiment (Heat Absorber 60)

In addition, thermal runaway may also be reduced by disposing heat absorbers 60 inside the housing case. In this manner, each of heat absorbers 60 absorbs heat generated by the secondary battery cell causing thermal runaway in a case of thermal runaway caused by any one of the secondary battery cells inside the housing case, thereby reducing a chain of thermal runaway to the adjacent secondary battery cell. When heat absorbers 60 are disposed in battery housing spaces 16, efficient disposition of heat absorbers 60 is achievable inside the housing case having a limited volume without the necessity of preparing a space dedicated for heat absorbers 60. In particular, when the number of the battery housing spaces is larger than the number of the secondary battery cells, an excessive battery housing space is effectively utilized by disposing heat absorber 60 in the battery housing space in which the secondary battery cell is not housed.

Figure 23:
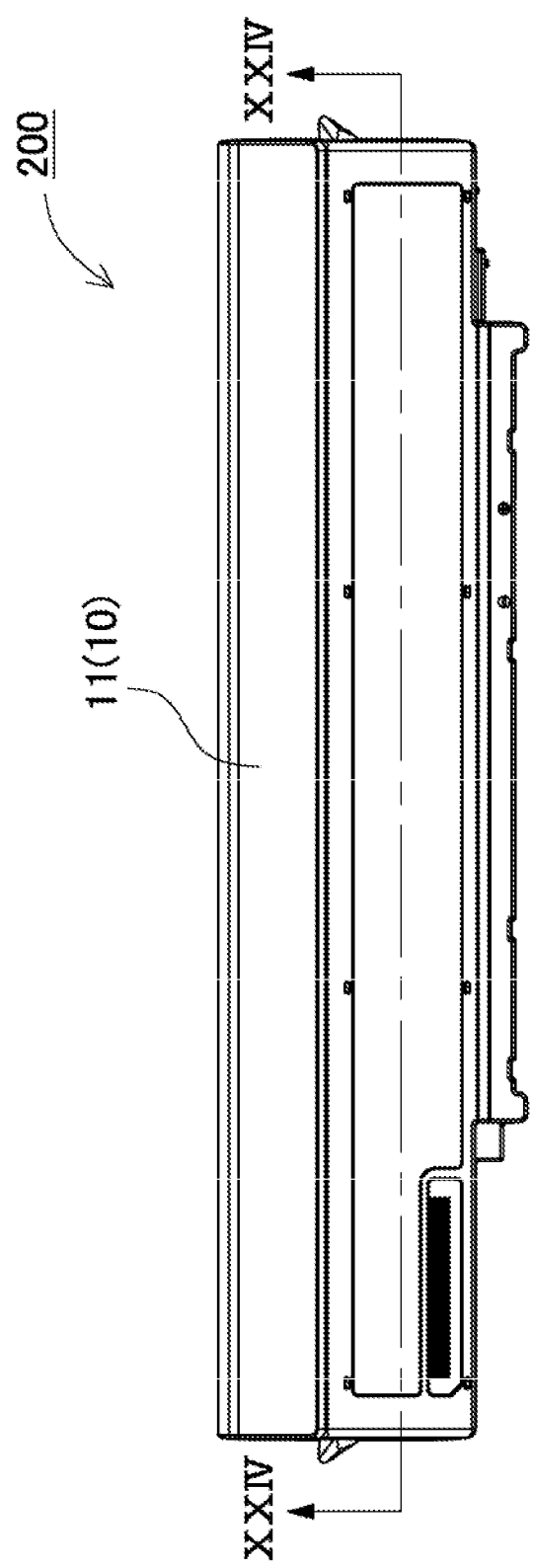
FIG. 23 is a plan view of a battery pack according to a second exemplary embodiment.
Figure 26:
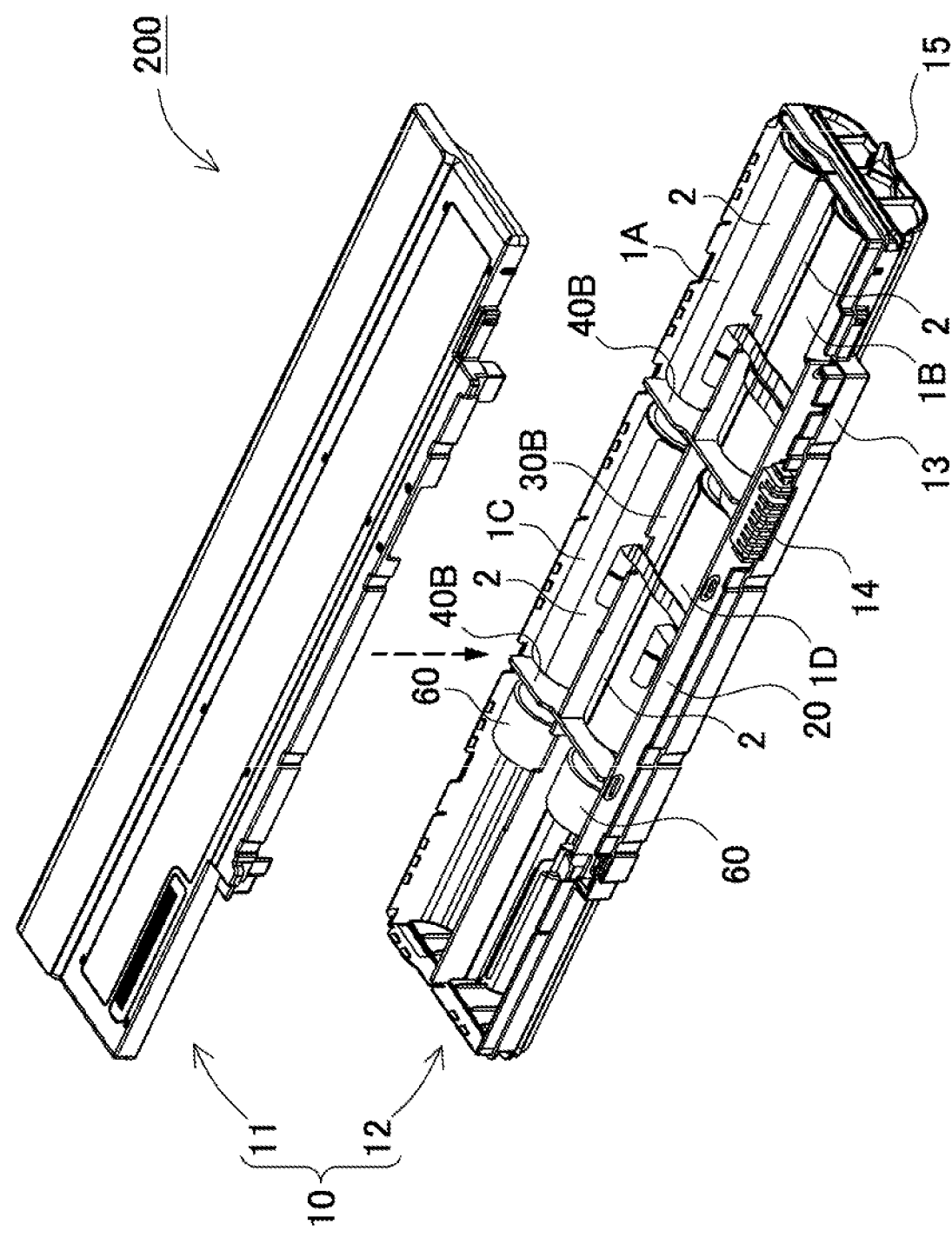
FIG. 26 is an exploded perspective view showing a state of the battery pack of FIG. 23 from which a cover is removed.
Figure 27:
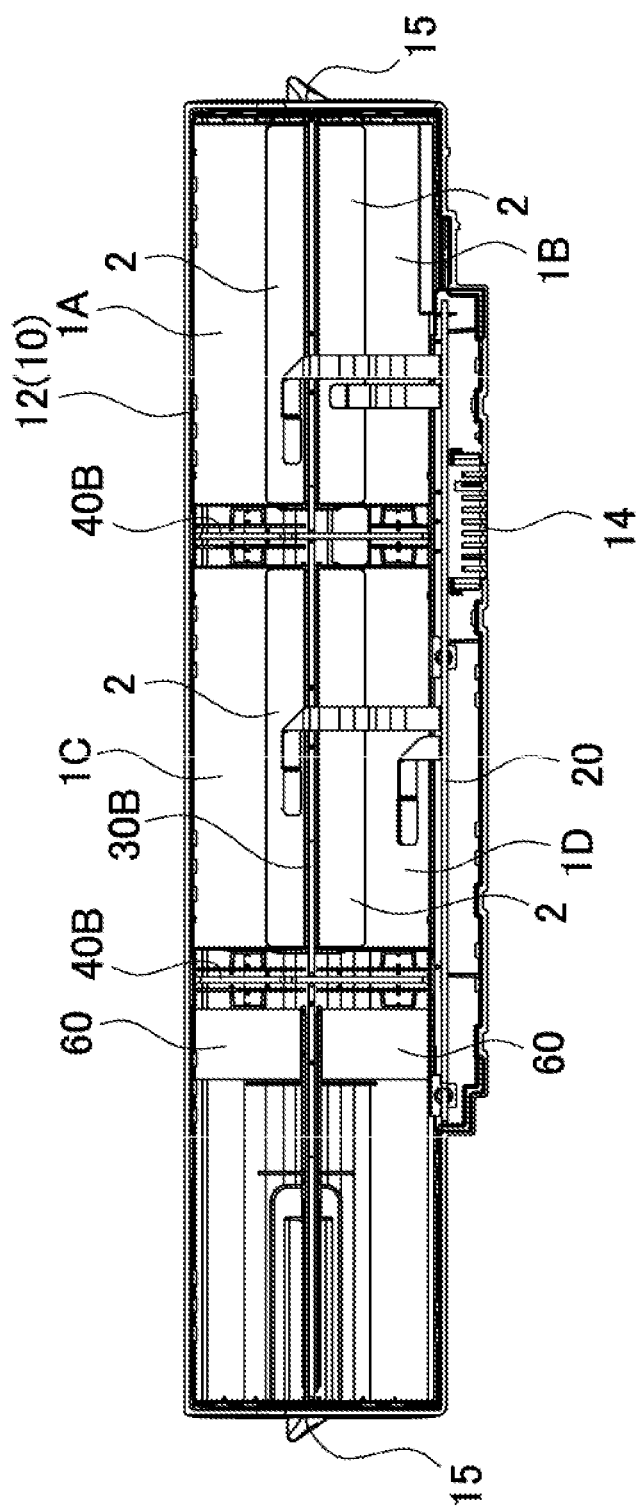
FIG. 27 is a plan view of the battery pack of FIG. 26.
Figure 28:
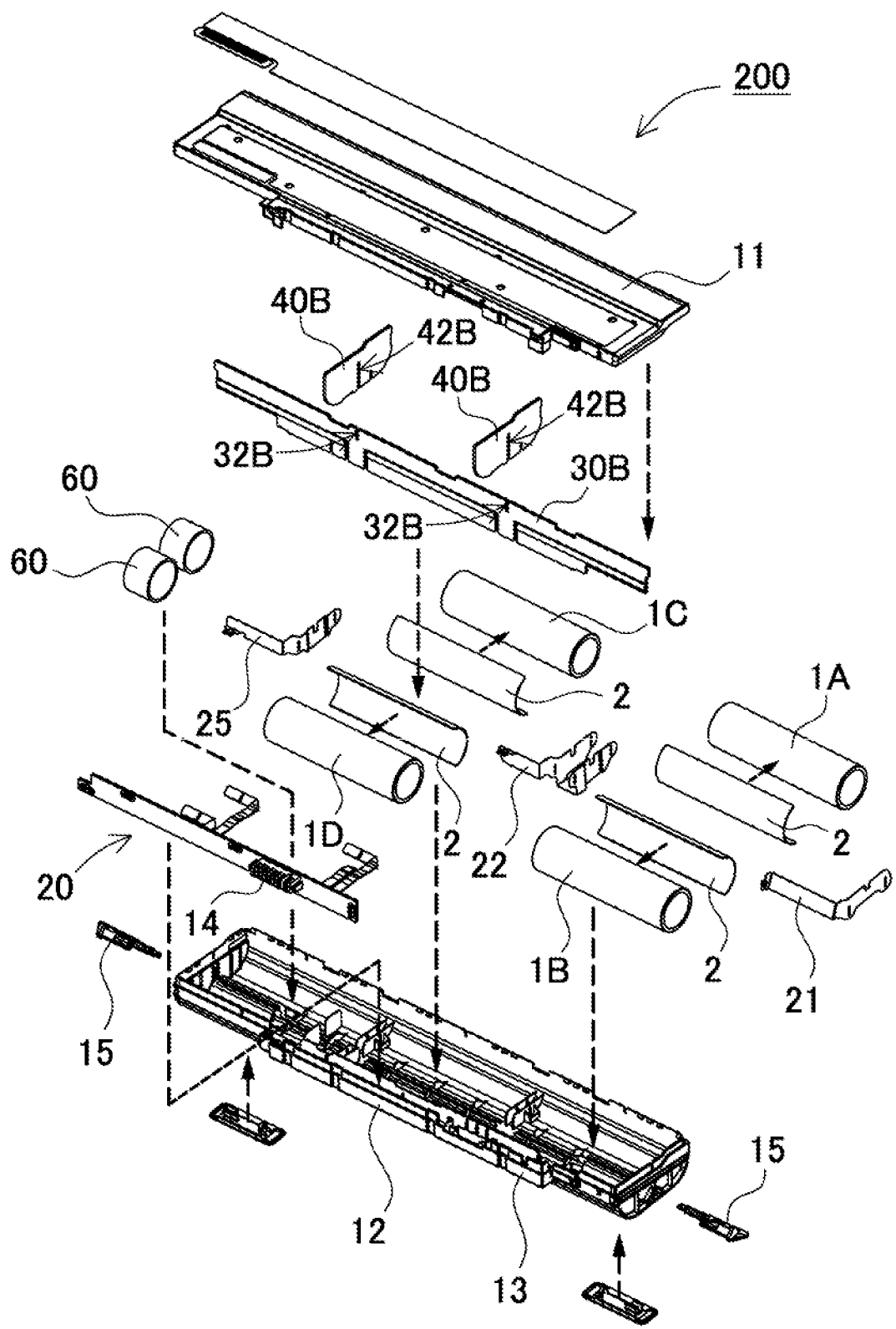
FIG. 28 is an exploded perspective view of the battery pack of FIG. 23.
Figure 29:
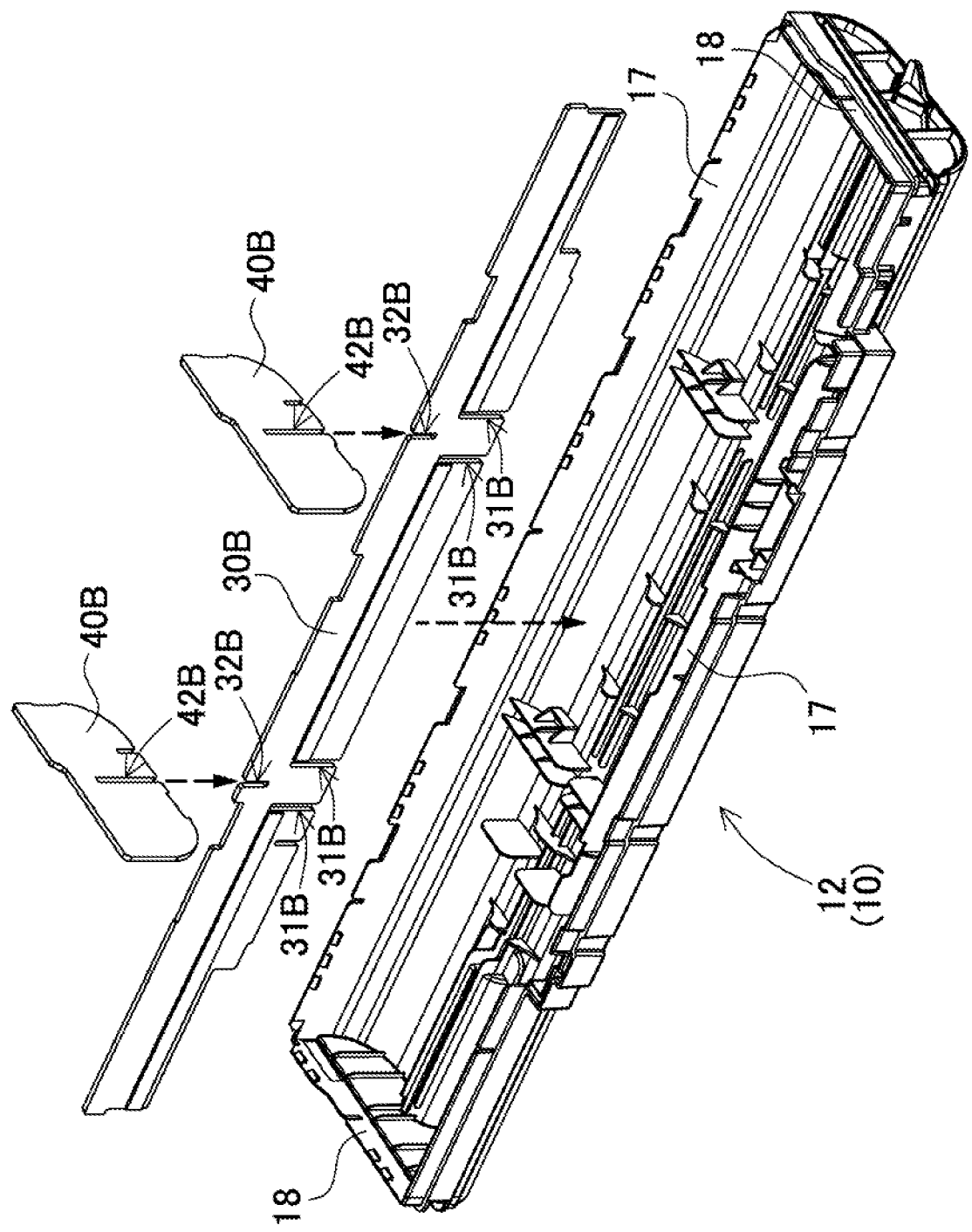
FIG. 29 is an exploded perspective view showing a state of the battery pack of FIG. 27 from which a longitudinal partition plate and lateral partition plates are removed.
Figure 30:
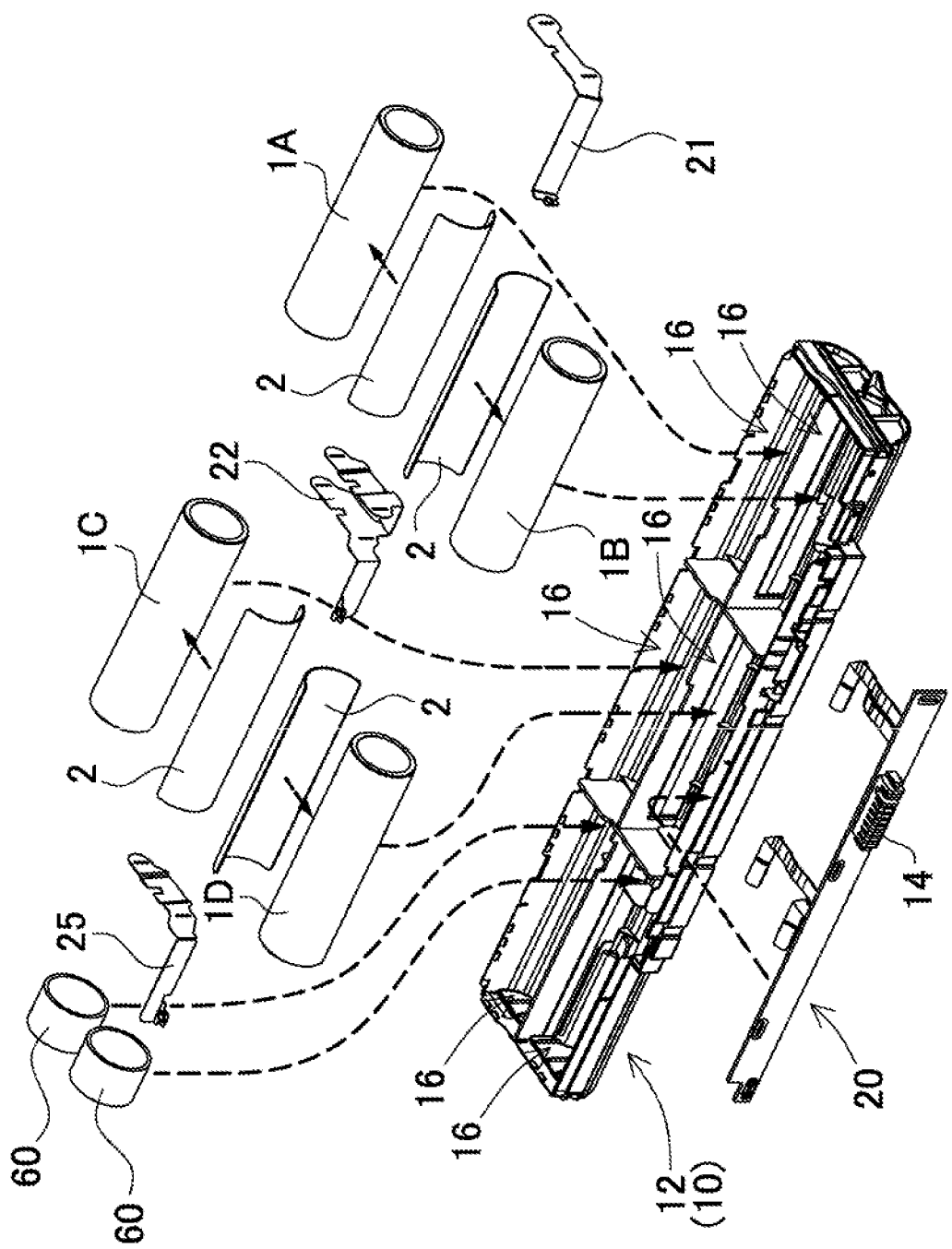
FIG. 30 is an exploded perspective view showing a state the battery pack of FIG. 29 where an insulating thermal resistant plate, the secondary battery cell, and a heat absorber are disassembled.

A battery pack including heat absorbers 60 described above is shown in FIGS. 23 to 30 as a second exemplary embodiment. In these figures, FIG. 23 is a plan view of battery pack 200 according to the second exemplary embodiment, FIG. 24 is a cross-sectional view taken along line XXIV-XXIV of FIG. 23, FIG. 25 is an enlarged cross-sectional view of FIG. 24, FIG. 26 is an exploded perspective view showing a state of battery pack 200 of FIG. 23 from which cover 11 is removed, FIG. 27 is a plan view of battery pack 200 of FIG. 26, FIG. 28 is an exploded perspective view of battery pack 200 of FIG. 23, FIG. 29 is an exploded perspective view showing a state of battery pack 200 of FIG. 27 from which longitudinal partition plate 30 and lateral partition plates 40 are removed, and FIG. 30 is an exploded perspective view showing a state of battery pack 200 of FIG. 29 where insulating thermal resistant plates 2, the secondary battery cells, and heat absorbers are disassembled. Note that parts identical to corresponding parts of the first exemplary embodiment described above are given identical reference numerals, and detailed description of these parts will be omitted where appropriate.

Each of heat absorbers 60 is a metal part having a cylindrical shape which is hollow inside. This shape increases a surface area and enhances a heat absorption effect while reducing a weight of heat absorber 60. An aluminum pipe can be preferably used as heat absorber 60 made of metal. Aluminum has stable characteristics such as lightweight, high heat transfer property, low-cost, and no corrosion.

In addition, heat absorber 60 is not necessarily required to have the same length as the length of the secondary battery cell, and may be shorter than the length of the secondary battery cell. This reduction of the length can reduce material cost and weight. The length of heat absorber 60 is appropriately set according to a required amount of heat absorption such as the capacity of the secondary battery cell to be used and the temperature at the time of heat generation.

When heat absorbing body 60 is shortened, heat absorber 60 is fixed without movement in corresponding battery housing space 16. For example, double-sided tape or adhesive is used. When heat absorber 60 is made shorter than the secondary battery cell, heat absorber 60 is eccentrically fixed in battery housing space 16 in such a manner as to come close to different battery housing space 16 which is located adjacent to corresponding battery housing space 16 in the longitudinal direction, and houses the different secondary battery cell. By disposing heat absorber 60 close to the end surface of the secondary battery cell corresponding to a heat absorbing target, the heat absorbing effect can be effectively exerted during heat generation from the corresponding secondary battery cell.

According to the second exemplary embodiment, the directions in which longitudinal side slits 32B and lateral side slits 42B formed in longitudinal partition plate 30B and lateral partition plates 40B are opposite to the corresponding directions of the first embodiment as shown in FIGS. 28 and 29, and other figures. Specifically, longitudinal side slits 32B are formed at an upper end side of longitudinal partition plate 30B, while lateral side slit 42B is formed at a lower end side of each of lateral partition plates 40B. In addition, lead slits 31B through which lead plates 22, 25 are inserted are formed in longitudinal partition plate 30B separately from longitudinal side slits 32B. Lead slits 31B thus formed are provided on the lower end side of longitudinal partition plate 30B. Lead slits 31B and longitudinal side slits 32B are formed at the opposite edges as described above. This configuration eliminates the necessity of work for setting longitudinal partition plate 30B in a state where lead plates 22, 25 and lateral partition plates 40B have been set in housing case 10 in advance. Specifically, this configuration eliminates the necessity for positional alignment to allow simultaneous insertion of lead plates 22, 25 and lateral partition plates 40B into the lead slits and the longitudinal side slits at the time of setting of longitudinal partition plate 30B in housing case 10. Instead, either lead plates 22, 25 or lateral partition plates 40B (for example, only lead plates 22, 25) may be initially guided to lead slit 31B to set longitudinal partition plate 30B, and then lateral partition plates 40B may be set to position only lateral side slits 42B. Workability improves by dividing the positioning work for the slits in this manner.

INDUSTRIAL APPLICABILITY

The battery pack according to the present invention is suitably applicable to a chargeable/dischargeable battery pack for a battery-driven device such as a laptop computer, a cellular phone, a portable digital versatile disc (DVD) player, a portable car navigation system, a portable music player, a power tool, and an assisted bicycle.

The invention claimed is:

1. A battery pack comprising:
   a plurality of secondary battery cells each having a cylindrical shape and, connected in series and/or in parallel with each other;
   a housing case that has an internal space for housing the plurality of secondary battery cells; and
   a longitudinal partition plate that is disposed in parallel with a longitudinal direction of the housing case, and partitions the internal space of the housing case into battery housing spaces, the battery housing spaces each housing a corresponding one of the plurality of secondary battery cells, wherein the plurality of secondary battery cells are aligned in parallel in such postures that side surfaces of the cylindrical shapes face each other in the internal space of the housing case, and are separated from each other with the longitudinal partition plate interposed between the plurality of secondary battery cells, a pair of ribs are provided on an inner surface of the housing case to hold the longitudinal partition plate, the longitudinal partition plate disposed between the pair of ribs is held in the housing case, and a gap produced when the longitudinal partition plate is disposed between the pair of ribs is filled with a flame-retardant adhesive material.

2. The battery pack according to claim 1, further comprising an insulating thermal resistant plate that has electrical insulation and thermal resistance properties, and covers at least a region of the side surface included in each of the plurality of secondary battery cells and facing the side surface of adjacent one of the plurality of secondary battery cells.

3. The battery pack according to claim 2, wherein the insulating thermal resistant plate is curved along the side surface of the cylindrical shape of each of the plurality of secondary battery cells.

4. The battery pack according to claim 3, wherein the insulating thermal resistant plate covers each of a pair of the plurality of, secondary battery cells provided in such a manner that the side surfaces of the cylindrical shapes are located adjacent to each other, and is curved around a position where the pair of the plurality of secondary battery cells come closest to each other in a cross-sectional view.

5. The battery pack according to claim 2, wherein the insulating thermal resistant plate contains fibers.

6. The battery pack according to claim 2, wherein the insulating thermal resistant plate is a plate member made of an inorganic material.

7. The battery pack according to claim 2, wherein the insulating thermal resistant plate is made of mica.

* * * * *